(12) United States Patent
Wojsznis et al.

(10) Patent No.: US 8,880,203 B2
(45) Date of Patent: Nov. 4, 2014

(54) ON-LINE ALIGNMENT OF A PROCESS ANALYTICAL MODEL WITH ACTUAL PROCESS OPERATION

(75) Inventors: Wilhelm K. Wojsznis, Austin, TX (US); Terrence Lynn Blevins, Round Rock, TX (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 1122 days.

(21) Appl. No.: 12/784,689

(22) Filed: May 21, 2010

(65) Prior Publication Data

US 2011/0288660 A1 Nov. 24, 2011

(51) Int. Cl.
G05B 23/02 (2006.01)

(52) U.S. Cl.
CPC .................. *G05B 23/024* (2013.01)
USPC ............ 700/30; 700/103; 700/146; 700/110; 700/121; 700/131

(58) Field of Classification Search
None
See application file for complete search history.

(56) References Cited

U.S. PATENT DOCUMENTS

| | | | | |
|---|---|---|---|---|
| 5,386,492 A * | 1/1995 | Wilson et al. | ................. | 704/252 |
| 5,682,464 A * | 10/1997 | Sejnoha | ........................ | 704/238 |
| 6,885,907 B1 | 4/2005 | Zhang et al. | | |
| 7,167,773 B2 * | 1/2007 | Schneider et al. | ............ | 700/198 |
| 7,461,040 B1 * | 12/2008 | Goldman et al. | ................ | 706/45 |
| 2004/0006470 A1 * | 1/2004 | Kobayashi | ..................... | 704/255 |
| 2005/0268197 A1 | 12/2005 | Wold | | |
| 2008/0103747 A1 * | 5/2008 | Macharia et al. | ................ | 703/11 |
| 2008/0109100 A1 * | 5/2008 | Macharia et al. | ............. | 700/110 |
| 2009/0036026 A1 * | 2/2009 | David et al. | ........................ | 451/5 |
| 2009/0143873 A1 * | 6/2009 | Navratil et al. | .................. | 700/31 |
| 2009/0287320 A1 * | 11/2009 | MacGregor et al. | ............. | 700/29 |
| 2010/0056023 A1 * | 3/2010 | David et al. | ......................... | 451/5 |
| 2010/0057237 A1 | 3/2010 | Kettaneh et al. | | |
| 2010/0217430 A1 * | 8/2010 | David et al. | .................... | 700/160 |
| 2011/0276164 A1 * | 11/2011 | Bourg et al. | .................. | 700/104 |
| 2012/0114836 A1 * | 5/2012 | Arno et al. | .......................... | 427/8 |

FOREIGN PATENT DOCUMENTS

WO  WO-2010/030524 A2  3/2010

OTHER PUBLICATIONS

Kourti, T. (2003), Multivariate dynamic data modeling for analysis and statistical process control of batch processes, start-ups and grade transitions. J. Chemometrics, 17: 93-109.*

Kassidas, A., MacGregor, J. F. and Taylor, P. A. (1998), Synchronization of batch trajectories using dynamic time warping. AIChE J., 44: 864-875.*

(Continued)

*Primary Examiner* — Kavita Padmanabhan
*Assistant Examiner* — Christopher E Everett

(57) ABSTRACT

A batch modeling and analysis system uses a simple and computationally inexpensive technique to align data collected from an on-going, currently running or on-line batch process with a batch model formed for the batch process so as to enable the reliable determination of the current operational state of the on-line batch process with respect to the batch model. This data alignment technique enables further statistical processing techniques, such as projection to latent sources (PLS) and principle component analysis (PCA) techniques, to be applied to the on-line batch data to perform analyses on the quality of the currently running batch. These analyses, in turn, provide useful information to a user, such as a batch operator, that enables the user to determine the quality of the batch at the present time, based on the batch model, and the likelihood that the desired batch output quality metrics will be reached at the end of the batch run.

39 Claims, 10 Drawing Sheets

(56) References Cited

OTHER PUBLICATIONS

Yuan Yao, Furong Gao, A survey on multistage/multiphase statistical modeling methods for batch processes, Annual Reviews in Control, vol. 33, Issue 2, Dec. 2009, pp. 172-183.*

Blevins et al., "When Batch Processing is Critical to Your Operations, Imagine the Worth of Knowing the Predicted Value of Quality Parameters," ControlGlobal.com (May 2008). Retrieved from the Internet on Jul. 14, 2011: URL:http://www.controlglobal.com/articles/2008/164.html?page=print.

Cinar et al., "Batch Fermentation—Modeling, Monitoring, and Control," Marcel Dekker, pp. 315-353 (2003).

Jørgensen et al., "On-Line Batch Fermentation Process Monitoring (NIR)—Introducing 'Biological Process Time'," *Journal of Chemometrics*, 18:81-91 (2004).

Kassidas et al., Synchronization of Batch Trajectories Using Dynamic Time Warping, *AIChE Journal*, 44(4):864-875 (Apr. 1998).

Kohonen et al., "Multi-Block Methods in Multivariate Process Control," *Journal of Chemometrics*, 22:281-287 (2008).

Lee et al., "Enhanced Process Monitoring of Fed-Batch Penicillin Cultivation Using Time-Varying and Multivariate Statistical Analysis," *Journal of Biotechnology*, 110:119-136 (2004).

Lefrancois et al., "Tools for Online Analytics," Emerson Exchange Workshop (2008).

Marruchella et al., "Benefits Achieved Using Online Analytics in a Batch Manufacturing Facility," Presentation at the WBF Make2Profit Conference, Austin, Texas, pp. 1-13 (May 2010).

Mason et al., "Multivariate Statistical Process Control with Industrial Application," ASA-SIAM Series on Statistics and Applied Probability (2002). Table of Contents only.

McMillan et al., "PAT Tools for Accelerated Process Development and Improvement," *BioProcess International*, 6(S1):34-42 (Mar. 2008).

Moro et al., "Integrating SAP® Software into DeltaV," Emerson Exchange Workshop, pp. 1-49 (2008).

Nomikos et al., "Multi-Way Partial Least Squares in Monitoring Batch Processes," *Chemometrics and Intelligent Laboratory Systems*, 30:97-108 (1995).

Qin, "Statistical Process Monitoring: Basis and Beyond," *Journal of Chemometrics*, 17:480-502 (Sep. 2003).

Reiss et al., "Partial Least Squares Confidence Interval Calculation for Industrial End-of-Batch Quality Prediction," *Chemometrics and Intelligent Laboratory Systems*, 100(2):75-82 (2010).

U.S. Food and Drug Administration, Office of Pharmaceutical Science: URL:http://www.fda.gov/Cder/OPS/PAT.htm.

Westerhuis et al., "Analysis of Multiblock and Hierarchical PCA and PLS Models," *Journal of Chemometrics*, 12:301-321 (1998).

Wojewodka et al., "Benefits Achieved Using On-Line Data Analytics," Emerson Exchange Workshop, pp. 1-35 (2009).

Wojewodka et al., "Coupling Process Control Systems and Process Analytics to Improve Batch Operations," Emerson Exchange Workshop, pp. 1-36 (2007).

Wojewodka et al., "Data Analytics in Batch Operations," *Control* (2008).

Wojewodka et al., "Process Analytic in Depth," Emerson Exchange Short Course, pp. 1-80 (2008).

Wojewodka et al., "The Application of Data Analytics in Batch Operations," Emerson Exchange Short Course, pp. 1-33 (2008).

Zhang, "Multivariate Statistical Process Control," New Directions in Bioprocess Modeling and Control, Chapter 8, pp. 247-286, Boudreau et al., ISA, Research Triangle Park (2006).

International Preliminary Report on Patentability for Application No. PCT/US2011/037480, dated Nov. 27, 2012.

Search Report for Application No. GB1107729.4, dated Nov. 25, 2011.

* cited by examiner

ON-LINE ALIGNMENT OF A PROCESS ANALYTICAL MODEL WITH ACTUAL PROCESS OPERATION

FIELD OF THE DISCLOSURE

This patent relates generally to process control systems and, more particularly, to the implementation of a data alignment technique used in a batch modeling system that assists in the analysis and prediction of the quality of an on-line or on-going batch process.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations (e.g., workstations) which are typically implemented using a personal computer, laptop, or the like and which are communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

Typically, displaying process information in the graphical user interface is limited to the display of a value of each process variable associated with the process. Additionally, some process control systems may characterize simple relationships between some process variables to determine quality metrics associated with the process. However, in cases where a resultant product of the process does not conform to predefined quality control metrics, the process and/or other process variables can only be analyzed after the completion of a batch, a process, and/or an assembly of the resulting product. While viewing the process and/or quality variables upon the completion of the process enables improvements to be implemented to the manufacturing or the processing of subsequent products, these improvements are not able to remediate the current completed products, which are out-of-spec.

This problem is particularly acute in batch processes, that is, in batch process control systems that implement batch processes. As is known, batch processes typically operate to process a common set of raw materials together as a "batch" through various numbers of stages or steps, to produce a product. Multiple stages or steps of a batch process may be performed in the same equipment, such as in a tank, while others of the stages or steps may be performed in other equipment. Because the same raw materials are being processed differently over time in the different stages or steps of the batch process, in many cases within a common piece of equipment, it is difficult to accurately determine, during any stage or step of the batch process, whether the material within the batch is being processed in a manner that will likely result in the production of the end product that has desired or sufficient quality metrics. That is, because the temperature, pressure, consistency, pH, or other parameters of the materials being processed changes over time during the operation of the batch, many times while the material remains in the same location, it is difficult to determine whether the batch processes is operating at any particular time during the batch run in a manner that is this likely to produce an end product with the desired quality metrics.

One known method of determining whether a currently operating batch is progressing normally or within desired specifications (and is thus likely to result in a final product having desired quality metrics) compares various process variable measurements made during the operation of the on-going batch with similar measurements taken during the operation of a "golden batch." In this case, a golden batch is a predetermined, previously run batch selected as a batch run that represents the normal or expected operation of the batch and that results in an end product with desired quality metrics. However, batch runs of a process typically vary in temporal length, i.e., vary in the time that it takes to complete the batch, making it difficult to know which time, within the golden batch, is most applicable to the currently measured parameters of the on-going batch. Moreover, in many cases, batch process variables can vary widely during the batch operation, as compared to those of a selected golden batch, without a significant degradation in quality of the final product. As a result, it is often difficult, if not practically impossible, to identify a particular batch run that is capable of being used in all cases as the golden batch to which all other batch runs should be compared.

A method of analyzing the results of on-going batch processes that overcomes one of the problems of using a golden batch involves creating a statistical model for the batch. This technique involves collecting data for each of a set of process variables (batch parameters) from a number of different batch runs of a batch process and identifying or measuring quality metrics for each of those batch runs. Thereafter, the collected batch parameters and quality data is used to create a statistical model of the batch, with the statistical model representing the "normal" operation of the batch that results in desired quality metrics. This statistical model of the batch can then be used to analyze how different process variable measurements made during a particular batch run statistically relate to the same measurements within the batch runs used to develop the model. For example, this statistical model may be used to provide an average or a median value of each measured process variable, and a standard deviation associated with each measured process variable at any particular time during the batch run to which the currently measured process variables can be compared. Moreover, this statistical model, may be used to predict how the current state of the batch will effect or relate to the ultimate quality of the batch product produced at the end of the batch.

Generally speaking, this type of batch modeling requires huge amounts of data to be collected from various sources such as transmitters, control loops, analyzers, virtual sensors, calculation blocks and manual entries. Most of the data is stored in continuous data historians. However, significant amounts of data and, in particular, manual entries, are usually associated with process management systems. Data extraction from both of these types of systems must be merged to satisfy model building requirements. Moreover, as noted above, a batch process normally undergoes several significantly different stages, steps or phases, from a technology and modeling standpoint. Therefore, a batch process is typically sub-divided with respect to the phases, and a model may be constructed for each phase. In this case, data for the same phase or stage, from many batch runs, is grouped to develop the statistical model for that phase or stage. The purpose of such a data arrangement is to remove or alleviate process non-linearities. Another reason to develop separate batch models on a stage, phase or other basis is that, at various different stages of a batch, different process parameters are active and are used for modeling. As a result, a stage model can be constructed with a specific set of parameters relevant for each particular stage to accommodate or take into account only the process parameters relevant at each batch stage. For example at a certain stage, additives may be added to the main batch load, and process parameters pertaining to those additives do not need to be considered in any preceding batch stage, but are relevant to the batch stage at which the additives are added.

However in creating this statistical batch model, it is still necessary to deal with the fact that different batch runs typically span different lengths of time. This phenomena is based on a number of factors such as, for example, different wait times associated with operators taking manual actions within the batch runs, different ambient conditions that require longer or shorter heating or other processing times, variations in raw material compositions that lead to longer or shorter processing times during a batch run, etc. In fact, it is normal that the data trend for a particular process variable spans a different length of time in different batch runs, and therefore that common batch landmarks in the different batch process runs have time shifted locations with respect to one another. To create a valid statistical model, however, the data for each stage, operation, or phase of a batch must be aligned with comparable data from the same stage, operation or phase of the other batches used to create the model. Thus, prior to creating a statistical model for a batch process based on measured batch runs, it is necessary to align the batch data from the different batch runs to a common time frame.

A traditional technique used for aligning batch data from multiple different batch runs of a batch process uses an indicator variable to represent the progress of a particular batch run. The best indicator variable is typically smooth, continuous, and monotonic, and spans the range of all of the other process variables within the batch data set. To create the time aligned batch runs, batch data is then collected for all of the process variables and is adjusted in time with respect to the indicator variable. In this technique, a measure of the maturity or percent of completion of any batch run at any particular time is determined by the percent of the current value of the indicator variable to the final value of the indicator variable.

Another known method of aligning batch data from various different batch runs uses a dynamic time warping (DTW) technique, which is a technology barrowed from speech recognition. DTW minimizes the distance between respective process variable trajectories for different variables of the batch runs. In doing so, DTW takes into account all of the process variables in the time warping analysis, and has been determined to be an effective approach in aligning batch data. If desired, DTW can use an indicator variable as described above, or can use an additional variable created and defined as a fraction of the batch completion time. This indicator variable is added to the original process variable set to improve the robustness of the DTW calculation, and to prevent convergence to local minima over an excessive period of time. In any event, the DTW technique, when applied to batch data, generally skews the time scale of the data within a particular batch run based on the total time of the batch run, so as to compress or expand the time scale of the batch data to match a predetermined or a "normalized" time for the batch run. All of the batch runs of a data set are skewed to the normalized time, so as to align the data in each batch run with the data from the other batch runs to a common time scale. The batch model is then created from the batch data scaled to this common or normalized time scale.

Once the statistical model is created, subsequent batch runs can be compared to the model by collecting data for the batch and comparing that measured or collected data to the model data. However, to properly compare the data from each new batch run to the batch model, the new batch data must also be scaled (i.e., compressed or expanded) in time to match the normalized time used by the batch model. It is difficult to time scale batch data received from an on-going or on-line batch until that batch run is complete, as the run time of the on-going batch is unknown until the batch completes execution. Thus, batch data for new batch runs can be compared or analyzed with respect to the created batch model only really only after the batch run has completed execution. It is more useful, however, if the data collected from a batch run can be compared to or analyzed using the batch model while the batch run is still operating, as it is only while the batch run is still operating that changes in control parameters used to perform batch execution can be made to compensate for faults or other quality degradations within the batch. Moreover, it is helpful to be able to know, before the completion of a batch run, if that batch run is likely to result in an end product with unacceptable quality metrics. In particular, if it is known early on in the processing of a batch run that the batch run is unlikely to produce an end product with the desired quality metrics, the batch run can be halted or stopped, and the incomplete batch can be thrown away, to save processing time and energy, and to enable the equipment to be used to process other batches that will result in desired outputs.

Thus, a substantial obstacle in implementing an industrial on-line system for analyzing runs of a batch process arises because of the use of a normalized batch run time within the batch model (to compensate for the different time durations of the batch runs used to create the batch model) without the ability to know how to normalize the batch data collected from the on-line batch process. In an attempt to solve this problem, one DTW on-line implementation predicts the process variable trajectories at every scan of the batch run up to the batch stage end point. However, the prediction of these trajectories normally does not match with future batch runs. Also importantly, this on-line DTW procedure executes every new scan, accounting for the complete trajectory of the variable being analyzed, which makes this technique bulky, expensive in terms of processor usage, and too complex for on-line implementation in a process control system. Thus, the most common approaches being implemented for an on-line batch analysis application either assume that the on-line batch being analyzed and the aligned batches used in the development of the batch model have equal time durations, or use a set of heuristic rules to align batch data during operation of the batch. However, the assumption that the current batch will be the same length in time as the normalized time of the aligned batches used to create the batch model is usually incorrect, and thus leads to poor analysis results. Moreover, the simplified heuristic rules are typically not satisfied for the most applications. As a result, these techniques deliver misleading results.

SUMMARY

A batch modeling and analysis system uses a simple and computationally inexpensive technique to align data collected from an on-going, currently running or on-line batch process with a batch model formed for the batch process so as to enable the reliable determination of the current operational state of the on-line batch process with respect to the batch model. This data alignment technique enables further statistical processing techniques, such as partial least squares or projection to latent sources (PLS) and principle component analysis (PCA) techniques, to be applied to the on-line batch data to perform analyses on the quality of the currently running batch. These analyses, in turn, provide useful information to a user, such as a batch operator, that enables the user to determine the quality of the batch at the present time, based on the batch model, and the likelihood that the desired batch output quality metrics will be reached at the end of the batch run. Moreover, these analysis techniques may enable the user to determine if it would be better to halt or scrap the batch and start over, based on the current operational state of the batch, instead of continuing with the operation of the batch because the output of the batch will ultimately not have desired or acceptable quality measures. These analysis techniques may also enable the user to determine how to change processing of the batch in subsequent stages of the batch run to compensate for undesirable characteristics of the batch, so as to obtain the desired quality of the batch at the completion of the batch run.

DETAILED DESCRIPTION

Figure 1:
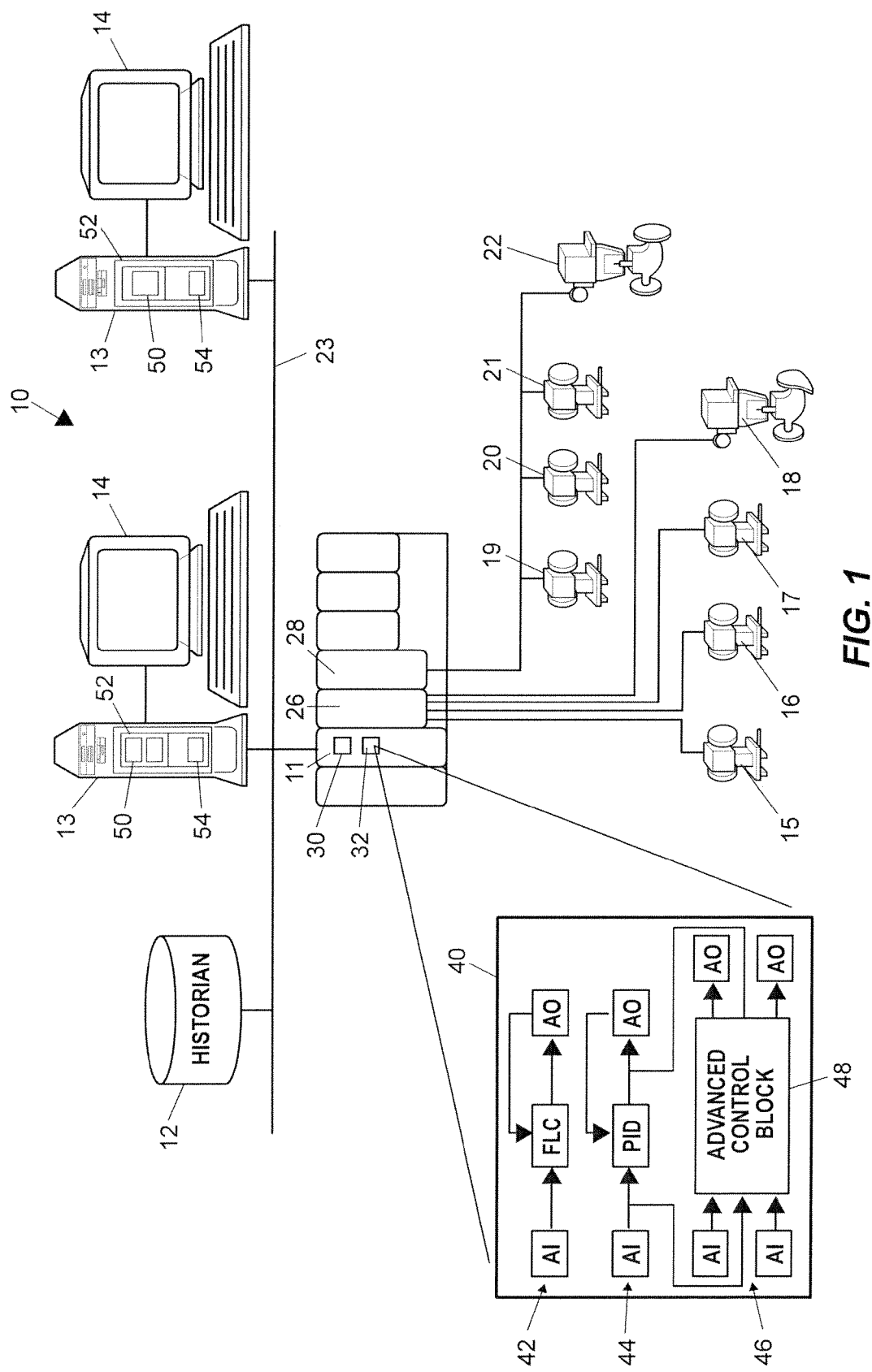
FIG. 1 is a diagram of a process control network having a controller and field devices that may be used to implement batch processes.

FIG. 1 illustrates an example process control system 10 including a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28 and may operate to implement one or more batch runs of a batch process using the field devices 15-22. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV® controller sold by Emerson Process Management, is communicatively connected to the host computers 13 and to the data historian 12 via, for example, an Ethernet connection or any other desired communication network 23. The controller 11 is also communicatively connected to the field devices 15-22 using any desired hardware and software associated with, for example, standard 4-20 ma devices and/or any smart communication protocol such as the FOUNDATION® Fieldbus protocol, the HART® protocol, the WirelessHART™ protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. Of course, the field devices 15-22 could conform to any other desired standard(s) or protocols, including any standards or protocols developed in the future.

The controller 11 includes a processor 30 that implements or oversees one or more process control routines (stored in a memory 32), which may include control loops, and communicates with the devices 15-22, the host computers 13 and the data historian 12 to control a process in any desired manner. It should be noted that any control routines or modules described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices.

As illustrated by the exploded block 40 of FIG. 1, the controller 11 may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs.

The advanced control block 48 may be any type of model predictive control (MPC) block, neural network modeling or control block, a multi-variable fuzzy logic control block, a real-time-optimizer block, etc. or may be an adaptively tuned control block, etc. It will be understood that the function blocks illustrated in FIG. 1, including the advanced control block 48, can be executed by the controller 11 or, alternatively, can be located in and executed by any other processing device, such as one of the workstations 13 or even one of the field devices 19-22.

Moreover, as illustrated in FIG. 1, one or more process analysis routines 50 may be stored and executed by various devices of the process control system 10. While process analysis routines 50 are illustrated as being stored in one or more computer readable memories 52 to be executed on processors 54 of the workstations 13, the routines 50 could be stored in and executed in other devices instead. Each process analysis routine 50 is communicatively coupled to one or more control routines such as the control routines 42, 44, 46, and/or to the data historian 12 to receive one or more measured process variable measurements. Each process analysis routine 50 may be used to develop a statistical process model and to analyze an on-going or on-line batch process based on that model. The analysis routines 50 may also display information to users, such as batch operators, regarding the on-line or on-going batch, as being implemented by the process control system 10.

Figure 2:
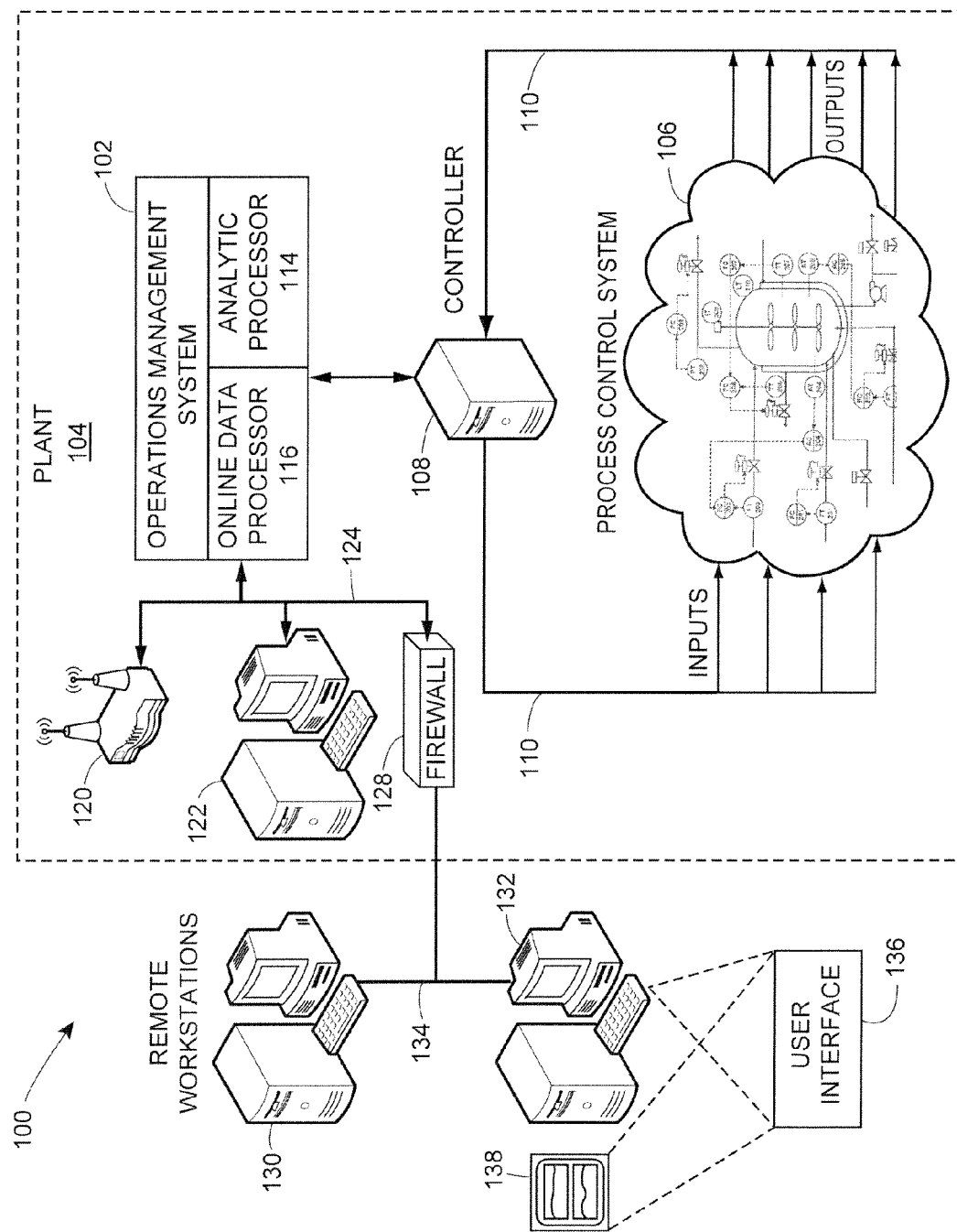
FIG. 2 is a block diagram illustrating an example process control system including an example operations management system that may implement an on-line batch analysis system for analyzing batch processes.

FIG. 2 is a block diagram illustrating a further example of a process control environment 100 including an operations management system (OMS) 102, also referred to as a Process Monitoring and Quality Prediction System (PMS), which can be used to implement an on-line batch process modeling and analysis system. The OMS 102 is located within a plant 104 that includes a process control system 106, which may include portions of or all of, for example, the process control network 10 of FIG. 1. The example plant 104 may be any type of manufacturing facility, process facility, automation facility, and/or any other type of process control structure or system. In some examples, the plant 104 may include multiple facilities located at different locations, and although the plant 104 of FIG. 1 is illustrated as including a single process control system 106, the plant 104 may include additional process control systems.

The process control system 106, which is communicatively coupled to a controller 108 via a data bus 110 may include any number of field devices (e.g., input and/or output devices) for implementing process functions such as performing physical functions within the process or taking measurements of process variables. The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure process variables within or portions of a process. The input devices may receive instructions from the controller 108 to execute one or more specified commands and cause a change to the process. Furthermore, the output devices measure process data, environmental data, and/or input device data and transmit the measured data to the controller 108 as process control information. This process control information may include the values of variables (e.g., measured process variables and/or measured quality variables) corresponding to a measured output from each field device.

In the illustrated example of FIG. 2, the controller 108 may communicate with the field devices within the process control system 106 via the data bus 110, which may be coupled to intermediate communication components within the process control system 106. These communication components may include field junction boxes to communicatively couple field devices in a command area to the data bus 110. Additionally, the communication components may include marshalling cabinets to organize the communication paths to the field devices and/or field junction boxes. Furthermore, the communication components may include I/O cards to receive data from the field devices and convert the data into a communication medium capable of being received by the example controller 108. These I/O cards may convert data from the controller 108 into a data format capable of being processed by the corresponding field devices. In one example, the data bus 110 may be implemented using the Fieldbus protocol or other types of wired and/or wireless communication protocols (e.g., Profibus protocol, HART protocol, etc.).

The controller 108 of FIG. 1 manages one or more control routines to manage the field devices within the process control system 106. The control routines may include process monitoring applications, alarm management applications, process trending and/or history applications, batch processing and/or campaign management applications, statistical applications, streaming video applications, advanced control applications, etc. Furthermore, the controller 108 may forward process control information to the OMS 102. The control routines may be implemented to ensure that the process control system 106 produces specified quantities of a desired product within a certain quality threshold. For example, the process control system 106 may be configured as a batch system that produces a product at a conclusion of a batch. In other examples, the process control system 106 may include a continuous process manufacturing system that constantly produces products.

The process control information from the controller 108 may include values corresponding to measured process and/or quality variables that originate in the field devices within the process control system 106. In other examples, the OMS 102 may parse values within the process control information into the corresponding variables. The measured process variables may be associated with process control information originating from field devices that measure portions of the process and/or characteristics of the field devices. The measured quality variables may be associated with process control information related to measuring characteristics of the process that are associated with at least a portion of a completed product.

For example, the process plant may perform a chemical reaction in a tank that produces a concentration of a chemical in a fluid. In this example, the concentration of the chemical in the fluid may be a quality variable. A temperature of the fluid and a rate of fluid flow into the tank may be process variables. The OMS 102, via process control modeling and/or monitoring, may determine that the concentration of the fluid in the tank is based on the temperature of the fluid in the tank and the fluid flow rate into the tank. Thus, not only is the concentration a quality variable, but the fluid flow rate and the fluid temperature contribute to or affect the quality of the concentration. In other words, the measured process variables contribute to or affect the quality of the measured quality variable. The OMS 102 may use statistical processing to determine the amount of influence and/or contribution each process variable has on a quality variable.

Additionally, the OMS 102 may model and/or determine relationships between the measured process variables and/or quality variables associated with the process control system 106. These relationships between the measured process and/or quality variables may produce one or more calculated quality variables. A calculated quality variable may be a multivariate and/or linear algebraic combination of one or more measured process variables, measured quality variables, and/or other calculated quality variables. Furthermore, the OMS 102 may determine an overall quality variable from a combination of the measured process variables, measured quality variables, and/or calculated quality variables. The overall quality variable may correspond to a quality determination of the entire process and/or may correspond to a predicted quality of a resulting product of the process.

As illustrated in FIG. 2, the OMS 102 includes an analytic processor 114 that utilizes descriptive modeling, predictive modeling, and/or optimization to generate feedback regarding the status and/or quality of the process control system 106. The analytic processor 114 may detect, identify, and/or diagnose process operation faults and predict the impact of any faults on quality variables and/or an overall quality variable associated with a quality of a resultant product of the process control system 106. Furthermore, the analytic processor 114 may monitor the quality of the process by statistically and/or logically combining quality and/or process variables into an overall quality variable associated with the overall quality of the process. The analytic processor 114 may then compare the values calculated for the overall quality variable and/or values associated with the other quality variables to respective thresholds. These thresholds may be based on the predetermined quality limits of the overall quality variable at different times within the process. For example, if an overall quality variable associated with a process exceeds a threshold for an amount of time, the predicted final quality of the resulting product may not meet quality metrics associated with the finished product.

If the overall quality variable and/or any other quality variables deviate from the respective thresholds, the analytic processor 114 may generate a fault indication within a process overview chart and/or a process variation graph that shows an explained and/or an unexplained variation (or variance) associated with the overall quality variable and/or may show a variable that generated the process fault. The example analytic processor 114 manages the analysis to determine a cause of one or more process faults by providing functionality that enables an operator to generate process quality graphs (e.g., combination graphs, microcharts, process variation graphs, variable trend graphs, graphics, etc.) that may display current and/or past values of measured process variables, measured quality variables, and/or calculated quality variables, etc. Furthermore, in some cases, the analytic processor 114 generates these graphs while the process is operating and continually updates and/or re-calculates multivariate statistics associated with each of the graphs as additional process control information is received by the OMS 102.

To perform these functions for batch processes, the OMS 102 collects batch process data for a number of different process variables for each of a number of different batch runs. This data may be collected from the controller 108 or the field devices within the control network 110, from a data historian (e.g., the historian 12 of FIG. 1) that may have already collected and stored process data for different batch runs of the process, or from any other data source. The OMS 102 then processes this data to generate one or more statistical batch models, and stores the statistical batch models in, for example, a memory, such as a computer readable memory of the OMS 102 or in one of the memories 52 of the workstations 13 of FIG. 1. The statistical batch models can then be retrieved as needed to analyze ongoing or on-line batch runs in the future. In particular, the OMS 102 may use the stored batch models to analyze or to enable a user to analyze data collected during the on-line or on-going operation of a particular batch run.

However, to analyze the data from a batch run while the batch is operating on-line, the OMS 102 must first determine the exact state or stage at which the on-line batch is operating with respect to the batch model. That is, the OMS 102 must determine what point of the batch model to compare to the on-line batch data to be able to determine other factors about the on-line batch, such as whether any of the parameters of the on-line batch are abnormal or out of specification with respect to those same parameters within the batch model, whether the output of the on-line batch will meet desired quality metrics, etc. In fact, any analysis of the on-line data that uses the statistical batch model must first determine the point within the statistical batch model that is most applicable to the on-line data. It is only after the on-line data is aligned with the statistical batch model that further analyses can be performed, such providing an operator with screens to illustrate how the on-line batch compares to the batch model, performing statistical analyses to determine whether the batch is operating normally or within bounds or whether the batch is operating abnormally and/or whether the output of the batch is predicted to meet desired quality metrics, such as desired consistency, concentrations, etc.

As one example, once the data for the current on-line batch is aligned to a particular point within the batch model, the analytic processor 114 of the OMS 102 may provided a series of different graphs or other displays to the user to enable the user to determine the current operational state or viability of the on-line batch run. Some of these graphs or displays are discussed below, it being understood that other displays, analyses or information may also or alternatively be provided to a user, such as an operator, maintenance personnel, etc.

As one example, the analytic processor 114 may generate a contribution graph by calculating contributions of process variables and/or quality variables to the overall quality variable or the quality variable triggering a fault. The contributions of the process and/or quality variables may be displayed as an explained and/or an unexplained variation of each variable as a contribution to the variation associated with the overall quality and/or the quality variable associated with the fault.

Furthermore, the analytic processor 114 may generate variable trend graphs for any of the selected process and/or quality variables that may have variations greater than a defined threshold. The variable trend graph may show values associated with the variable over a time of the process in relation to values of the variable during similar times in previous processes, e.g., the model variable values. By generating the contribution graph and/or the variable trend graphs, the analytic process 114 may also identify possible corrections to the process to mediate the detected fault in batch process. The variable trend graph may assist an operator to determine a cause of a process fault by providing an overlay of historical plots of data of the batches used to create the batch model with associated variations (e.g., standard deviations) with the current value aligned to the same time scale.

The analytic processor 114 may also generate a quality prediction graph to determine the effect of the correction(s), if implemented, on the overall quality of the process. If the correction(s) maintain or improve the overall quality to within specified thresholds, the analytic processor 114 may instruct the OMS 102 to implement the correction(s). Alternatively, the analytic processor 114 may send instructions to the controller 108 to implement the process correction(s).

Further, the example analytic processor 114 may generate a microchart upon determining a fault associated with an overall quality variable and/or any other quality variable. The microchart may include values of the process and/or quality variables at a specified time (e.g., a time associated with the process fault) in relation to a mean value and/or a standard deviation for each of the variables as predicted by the batch model. Additionally, the microchart may include spark lines that indicate prior values associated with each of the process and/or quality variables associated with the model. From the microchart, the example analytic processor 114 may enable an operator to determine and/or select one or more corrective actions to the process and/or determine if any of the corrections will improve the process such that the overall quality variable is predicted to be within the specified limits.

The OMS 102 manages access and control to the process control data including the process variation graphs, contribution graphs, variable trend graphs, quality prediction graphs, and/or microcharts via an online data processor 116. Additionally, the online data processor 116 provides access to process control operators to view process control data, change and/or modify process control data, and/or generate instructions for field devices within the process control system 106.

To provide access to the on-line analysis, the plant 104 of FIG. 2 is illustrated as including a router 120 and a local workstation 122 communicatively coupled to the online data processor 116 via a local area network 124 (LAN). Further, the router 120 may communicatively couple any other workstations (not shown) within the plant 104 to the LAN 124 and/or the online data processor 116. The router 120, which may communicatively couple to the other workstations wirelessly and/or via a wired connection, may include any type of wireless and/or wired router as an access hub to the LAN 124 and/or the online data processor 116.

The LAN 124 may be implemented using any desired communication medium and protocol. For example, the LAN 124 may be based on a hardwired or wireless Ethernet communication scheme. However, any other suitable communication medium and protocol could be used. Furthermore, although a single LAN is shown, more than one LAN and appropriate communication hardware within the workstation 122 may be used to provide redundant communication paths between the workstation 122 and a respective similar workstation (not shown).

The LAN 124 is also illustrated as being communicatively coupled to a firewall 128 which determines, based on one or more rules, whether communication from remote workstations 130 and/or 132 is to be permitted into the plant 104. The remote workstations 130 and 132 may provide operators that are not within the plant 104 access to resources within the plant 104. The remote workstations 130 and 132 are communicatively coupled to the firewall 128 via a Wide Area Network (WAN) 134.

The workstations 122, 130 and/or 132 may be configured to view, modify, and/or correct one or more processes within the process control system 106 based on the on-line analysis performed by the OMS 102, or these workstations may directly implement the on-line process analysis applications and methods described herein. For example the workstations 122, 130 and/or 132 may include a user interface 136 that formats and/or displays process control information generated by the OMS 102. As another example, the user interface 136 may receive generated graphs and/or charts or, alternatively, data for generating a process control graph and/or chart from the OMS 102. Upon receiving the graph and/or chart data in the respective workstation 122, 130, and/or 132, the user interface 136 may generate a display of a graph and/or a chart 138 that is relatively easy for an operator to understand. The example configuration of FIG. 2 illustrates the workstation 132 with the user interface 136. However, the workstations 122 and/or 130 may include user interfaces 136.

Additionally, the user interface 136 may alert a process control operator to the occurrence of any process control faults within the process control system 106 and/or any other process control systems within the plant 104 as determined by the on-line analysis described herein. Furthermore, the user interface 136 may guide a process control operator through an analysis process to determine a source of a process fault and to predict an impact of the process fault on the quality of the resultant product. The user interface 136 may provide an operator process control statistical information as the process is occurring, thereby enabling the operator to make any adjustments to the process to correct for any faults. By correcting for faults during the process, the operator may maintain a quality of the resulting product.

Additionally, the user interface 136, via the example OMS 102, may display the detection, analysis, corrective action, and quality prediction information. For example, the user interface 136 may display a process overview chart, a process variation graph, a microchart, a contribution graph, a variable trend graph, and/or a quality prediction graph (e.g., the graph 138). Upon viewing these graphs 138, the operator may select additional graphs 138 to view multivariate and/or statistical process information to determine a cause of a process fault. Additionally, the user interface 136 may display possible corrective actions to a process fault. The user interface 136 may then allow an operator to select one or more corrective actions. Upon a selection of a correction, the user interface 136 may transmit the correction to the OMS 102, which then sends an instruction to the controller 108 to make the appropriate correction in the process control system 106.

The workstations 122, 130 and/or 132 of FIG. 1 may include any computing device including a personal computer, a laptop, a server, a controller, a personal digital assistant (PDA), a micro computer, etc. The workstations 122, 130 and/or 132 may be implemented using any suitable computer system or processing system. For example, the workstations 122, 130 and/or 132 could be implemented using a single processor personal computer, single or multi-processor workstations, etc.

The process control environments 10 of FIG. 1 and 100 of FIG. 2 are provided to illustrate types of systems within which the example methods and apparatus described in greater detail below may be advantageously employed. However, the example methods and apparatus described herein may, if desired, be advantageously employed in other systems of greater or less complexity than the example process control environments 10 and 100 and/or the process control system 106 shown in FIGS. 1 and 2 and/or systems that are used in connection with process control activities, enterprise management activities, communication activities, etc.

Currently, many process control systems provide analytic and/or statistical analysis of process control information. However, these systems generally implement offline tools to determine the cause and potential corrective actions of process control faults that may affect the quality of resulting products. These offline tools may include process studies, lab studies, business studies, troubleshooting, process improvement analysis, and/or six-sigma analysis. While these tools may correct the process for subsequent products, the tools cannot remediate and/or correct process quality as the fault occurs. Thus, these offline tools are reactive to process control conditions and may result in the production of products with quality issues until the process can be corrected.

The example on-line batch process control system analyses described herein, on the other hand, may be used within a process control system to provide in-process fault detection, analysis, and/or correction information enabling an operator to correct a process fault while the process occurs or is on-going. In other words, process corrections can be implemented in response to predicted faults, at the time a fault occurs or substantially immediately after a fault occurs. While the example methods and apparatus described herein may be used to predict and/or correct process faults to improve process quality of a batch and/or continuous process, they will be particularly described with respect to batch processes. Additionally or alternatively, the example methods and apparatus may be used to correct product quality by predicting product quality and correcting corresponding process faults and/or by correcting detected process faults.

Figure 3:
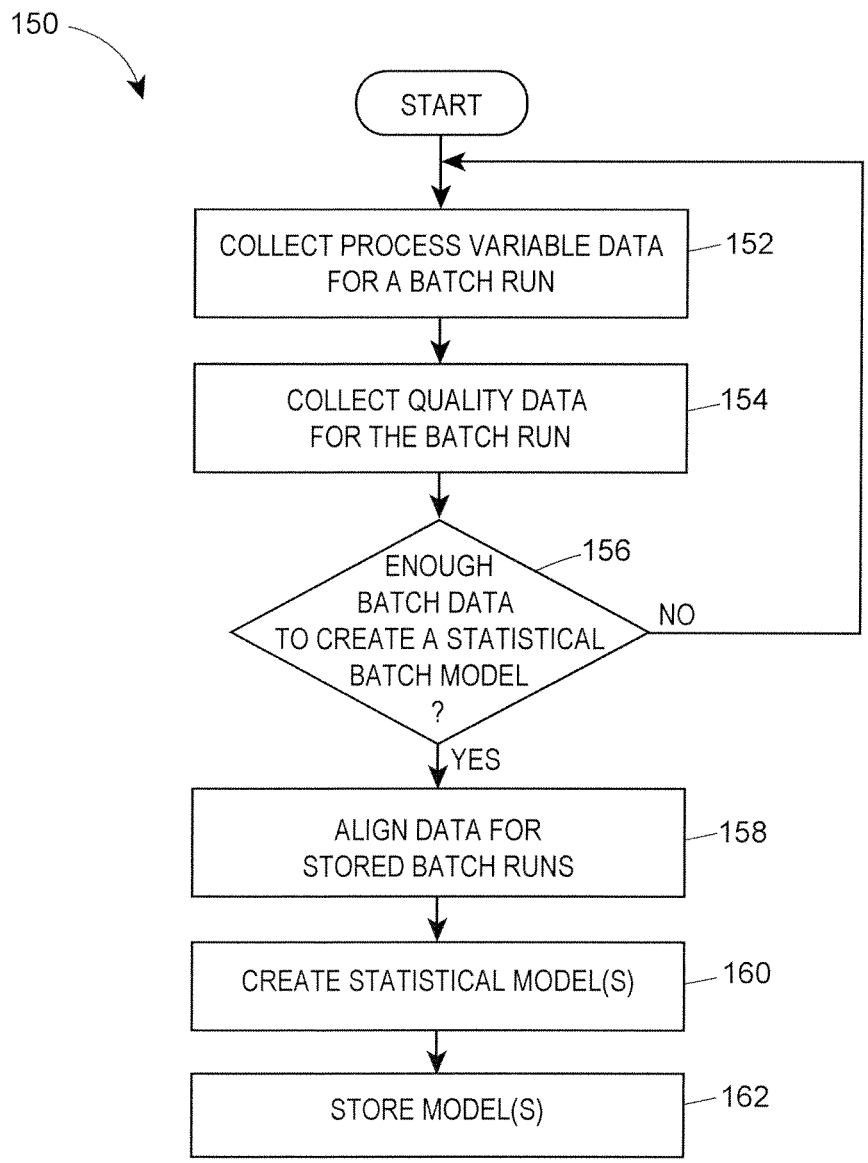
FIG. 3 is a flow chart of an example method of determining a statistical batch model for a batch process.

FIG. 3 depicts an example flow diagram 150 of a method that may be implemented by the OMS 102 (which may run the routine 50 of FIG. 1) to develop a statistical batch model for a batch process and to then use that statistical batch model to analyze data from an on-line batch process run. At a block 152, the OMS 102 collects batch data for a particular batch. This batch data may include measured, calculated or estimated process variable values for a number of different process variables for a particular batch run of the process including, for example, input variables such as raw material compositions, ongoing process variables such as temperatures, flow rates, levels or other process variable measurements, estimated process variables, environmental data such as humidity, ambient temperature, etc., lab data including any data measured or obtained off-line in one or more lab analyses, etc. This data may be collected on-line as the batch is running or may be collected or obtained from a data historian (such as the historian 12 of FIG. 1) for a previously run batch. If desired, a user or operator may select a particular batch run, the data for which is stored in a data historian, to use in the modeling process. At a block 154, after the completion of the batch run for which data was collected at the block 152, and/or at the end of different various stages, operations or phases of the batch, the OMS 102 collects quality measurements or quality data for the batch run. The quality data may include any type of measurement or indication of quality of the output of the batch or of the output of one of the stages, operations or phases of the batch including, for example, material consistency, concentrations of a particular chemical or element, pH, material compositions or ratios, and/or any other quality data that indicates the success of the batch run in producing an acceptable or desirable output. Of course, the particular quality data to be collected will be dependent upon the type of product being manufactured, and this quality data may be measured on-line, may be determined by lab analyses, may be determined by visual inspection (and input by a user), may be calculated based on other parameters, or may be determined in any other known manner. Moreover, this quality data may be obtained from a batch historian if this data is stored therein or via on-line processes or off-line lab analyses.

Figure 4:
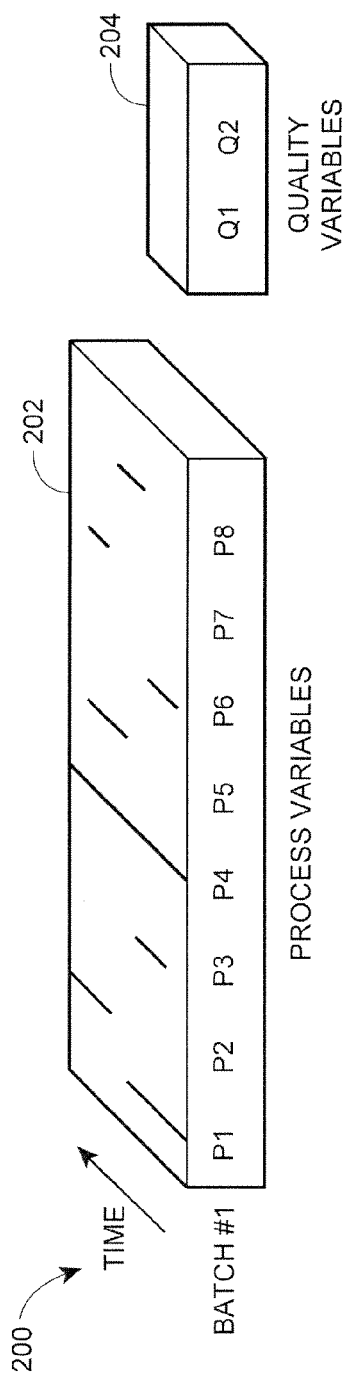
FIG. 4 is a diagram representing a data structure of an example batch run of a batch process, including process variables measurements and quality variable measurements associated with the batch process run.

FIG. 4 represents a data structure 200 for an example batch run (e.g., Batch #1) including measured process variables 202 and calculated or otherwise measured or determined quality variables 204, which may include one or more overall quality variables obtained at the end of the batch run via measurements or observations. As is known, batch processing is a type of product manufacturing wherein a relatively large number of products and/or portions of products are created in parallel at one or more locations controlled by a control routine. Moreover, batch processes typically include one or more process stages, with each stage including one or more operations and each operation including one or more phases. As such, the example measured process variables 202 may include process variables (also referred to as process parameters) from a single phase, operation or stage or process variables that span multiple phases, operations or stages of the batch process. By way of example, the variable P1 illustrated in FIG. 4 may correspond to a fluid flow rate (e.g., a process variable), while the variables P2-P8 may correspond to temperature, pressure, another flow rate, etc. The variables 204 may correspond to quality variables, such as concentration, etc. While the batch process of FIG. 4 is illustrated as including eight measured process variables 202 and two quality variables 204, in other examples, the batch process may include fewer or more process variables and or more or less quality variables. Additionally, the batch process data is collected during a time period shown along the z-axis (labeled as "Time" in FIG. 4).

The data graph 200 of FIG. 4 illustrates that some of the process variables 202 are relevant for only certain times during the batch process. For example, the process variable P1 is relevant from the start of the batch to a midway point through the batch (or the stage, operation or phase of the batch for which data was collected). Thus, if the variable P1 is associated with a fluid flow rate, fluid may only be flowing within the batch process from the beginning of the batch to a midpoint of the batch. After this point, the batch may not utilize a fluid flow and thus, the variable P1 is not relevant to the batch process at that time. In contrast, the variable P4 of FIG. 4 is relevant for the entire batch process.

The example quality variables 204 may be associated with the entire batch process or may be associated with a particular phase or stage of the batch process. The quality variables 204 may be the result of a multivariate, statistical, and/or algebraic relationship between the measured process variables 202 and/or other quality variables 204, may be measured or determined in any known manner or may be input by a user. For example, the quality variable Q1 may correspond to a composition quality of a product that resulted from the batch process. The composition quality Q1 is a quality variable even though it may not be directly measurable within the process control system 106. Instead, the composition quality Q1 may be modeled and/or determined from a multivariate combination of the measured variables 202 or may be determined by lab analyses.

Referring back to FIG. 3, the OMS 102 next determines, at a block 156, if batch data has been collected for enough batch runs of the process to create an adequate statistical model for the batch. If not, the block 156 returns control to the block 152 to collect further process variable data for another run of the batch process. Of course, if desired, the user may pre-select one or more batch runs to use in creating the batch model or may prevent certain batch runs (which fall outside the range of acceptable performance or which have other problems that might make them unacceptable for use in creating a batch model) from being used in creating the statistical batch model. In any event, when the block 156 determines that data for enough batch runs has been collected, a block 158 aligns the batch data from the stored batch models.

Figure 5:
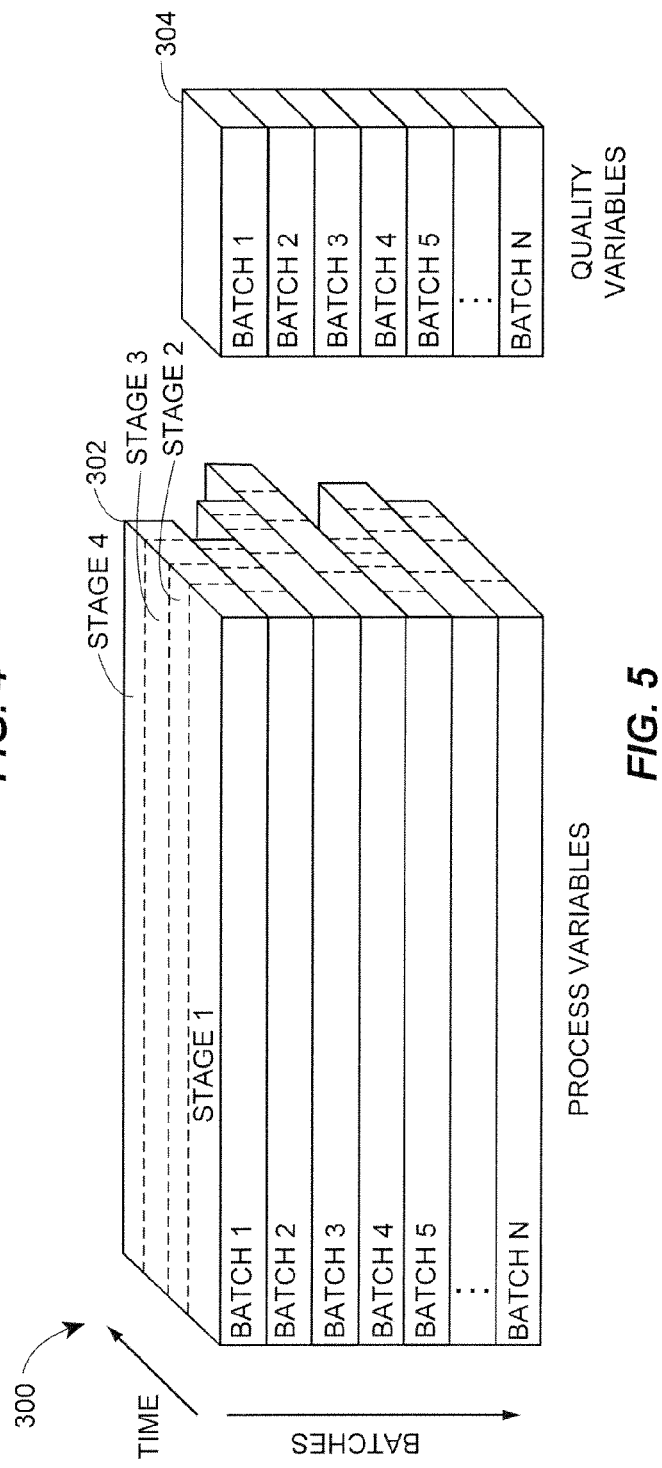
FIG. 5 is a diagram of a data structure illustrating batch data for a number of different batch runs of a batch process, including process variables and respective quality variables for each of the batch runs.

To illustrate this point, FIG. 5 represents a data structure 300 associated with a set of example batch runs that may be obtained in the blocks 152-156 of FIG. 3 and stored in a memory at the start of the block 158. As illustrated, the data structure 300 includes process variables 302 and respective quality variables 304 for each of a number of batch runs. The batch runs (e.g., BATCHES 1-N) show that this particular batch process includes four stages (e.g., STAGES 1-4) that are executed in a serial order. For example, STAGE 1 may correspond to a combination and mixing of chemicals in a batch while STAGE 2 may correspond to baking of those mixed chemicals in the batch. These stages may further be subdivided into operations, phases, and/or levels. Additionally, the quality variables 304 may correspond to the measured process variables 302 at each batch stage, phase, operation or level, and/or may correspond to the end of the batch.

The example data graph of FIG. 5 illustrates that each individual batch may differ in time duration, with the start and finish times of each stage of the batch also differing between batches. For example, BATCH 2 is completed in a shorter time than BATCH 1, but BATCHES 3 and 4 are completed in a longer time than BATCH 1. Furthermore, BATCH 1 requires a longer time to complete STAGE 1 than BATCH 2.

Referring back to FIG. 3, the block 158 aligns the batch data of FIG. 5 to enable the creation of the batch model. In some cases, this data may be aligned by expressing the relevant time duration of each variable (not shown) as being proportional to the length of time for the corresponding stage(s). Thus, the varying time to complete batches and/or stages may be resolved using the measured process variables 302 within each batch. In another example, the well-known DTW method discussed above may be used to align the batch data to a constant or normalized time frame which may be, for example, a median time frame of all the batches, an average time frame of all of the batches, or some other time frame such as that associated with a control batch or a selected batch. As aligned, the batch data would appear as illustrated in the data structure 350 of FIG. 6, in which the time frame of each batch is normalized to be exactly the same and all of the stages are aligned with one another, with the actual data points within each batch being skewed in time by being expanded or contracted in time, so as to match up with the normalized time frame to be used in batch model. Of course, the time within each stage (phase or operation) may be skewed differently based on the times of those stages (phases or operations) with respect to the normalized time for that particular stage (phase or operation), so as to make all the stages separately aligned. In any event, any known methods, such as the DTW method, may be used to time-align the batch data from the different batch runs prior to processing the batch data or developing a statistical model.

Figure 6:
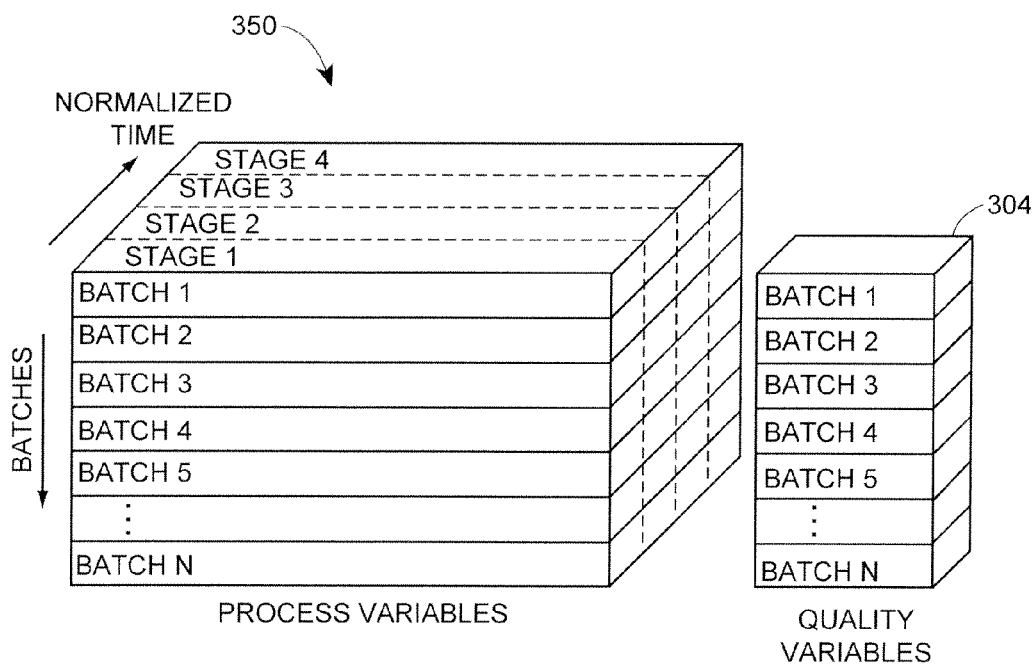
FIG. 6 is a diagram of a data structure illustrating batch data for a number of different batch runs of a batch process, including process variables and respective quality variables, after the data from the batch runs has been aligned in an off-line alignment process.

As will be understood, because of the expansion and contraction of the time frame within the different batch runs to create the data structure of FIG. 6, more or fewer data points for each batch run may be provided or associated with each of the different stages of the normalized data. If desired, this data may be converted to a fixed number or a fixed set of normalized data points (e.g., using linear or non-linear interpolation) so that each of the batches used to create the batch model have the same number of data points, or so that there are data points for each of the same times within the normalized time frame of the batch model. Of course, as noted above, the values of points within the data may be obtained by interpolation between multiple points using straight-line interpolation or any other desired interpolation, such as non-linear interpolation. Moreover, it will be understood that each data point collected for the various batch runs may be a statistical data point, such as an average value, a median value, etc. of a set of consecutively collected raw data points. Thus, for example, a single data point for a batch run may be created as a statistical combination of 10, 100, etc. raw data points to reduce the number of points stored in the memory and to reduce processing times associated with the model processing. Of course, the number of raw data points used to create any particular statistical data point in the batch runs may be based on the measurement frequency of the raw data as compared to the overall length of time within the batch, etc.

Figure 7:
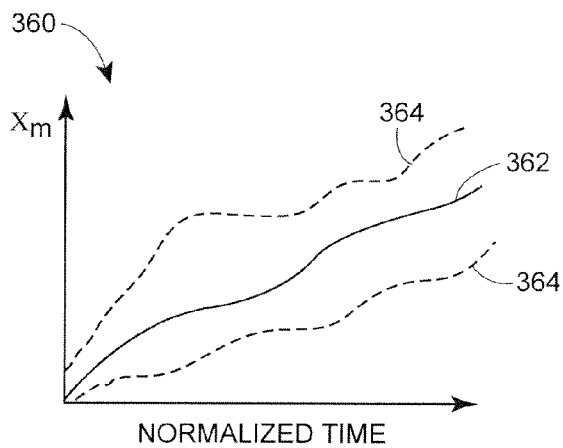
FIG. 7 depicts a graph illustrating a trajectory for a particular batch variable obtained from the aligned the batch data of FIG. 6.

Once the batch data from the different batch runs has been aligned, as illustrated in FIG. 6, a block 160 (FIG. 3) creates a statistical batch model from the aligned data to define, from a statistical standpoint, the normal or expected operation of the batch process as defined by the data collected from the different batch runs in steps 152-156. One method of creating a statistical batch model creates one or more model process variable trajectories for each of the process variables within the batch runs, wherein each such model process variable trajectory identifies or expresses the expected or normal operation of a process variable over the time period in which the process variable is relevant to batch operation. This time period may be, for example, the entire length of the batch, one or more batch stages, phases, operations, levels, etc. As an example, each model process variable trajectory may define as the expected value of the process variable as, for example, the average or the median value of the process variable (as calculated from the collected batch data) at each time position during the normalized time frame of the model. Additionally, if desired, each model process variable trajectory may include one or more standard deviations associated with the collected batch data at any particular time to indicate the typical variation of the batch data for that variable at that particular time. One example model process variable trajectory 360 is illustrated in FIG. 7. The model process variable trajectory 360 includes a mean or average value of the process variable over the normalized batch time (indicated by the solid line 362), as well as a first upper and lower standard deviation of the batch data over the normalized batch time (indicated by the dotted lines 364). Of course, the lines 362 and 364 may be determined statistically from the collected batch data of the different batch runs over the entire normalized time period of the model. Of course, a model process variable trajectory like that of FIG. 7 may be created for each of the measured or calculated process variables within the batch process, over any time period in which those process variables are relevant for modeling or comparison purposes. Moreover, while the line 362 indicates the average value of the batch variable at each time point and the lines 364 illustrate a first standard deviation of the batch variable value at each time point, model process variable trajectories could be created using other statistical measures of the process variable values including, for example, median values, second standard deviations or other variance determination values, etc.

Referring again to FIG. 3, the block 160 may also or alternatively develop other statistical models such as a PCA (principal component analysis) model or a PLS (projection to latent structures) model. As is known, the PCA modeling technique develops a set of principle components for the batch data, which can then be used to analyze other batch data, such as data from an on-line batch. Still further, the PLS modeling technique performs a PLS (projection onto latent structures) calculation to associate the process variable data collected or determined for the batches runs with the quality variables that were measured, calculated or otherwise determined for the batch runs used in the model. A PLS model can then be used to predict the quality variables of future batches based on the statistical values of variables within measured batches. PCA and PLS modeling techniques are well known and therefore will not be described in detail herein. Of course, if desired, other types of statistical batch models can be created from the aligned batch data of FIG. 6. In any event, after one or more statistical batch models are created, a block 162 stores theses models in a computer readable memory, such as in a memory 52 of FIG. 1, for later use.

Figure 8:
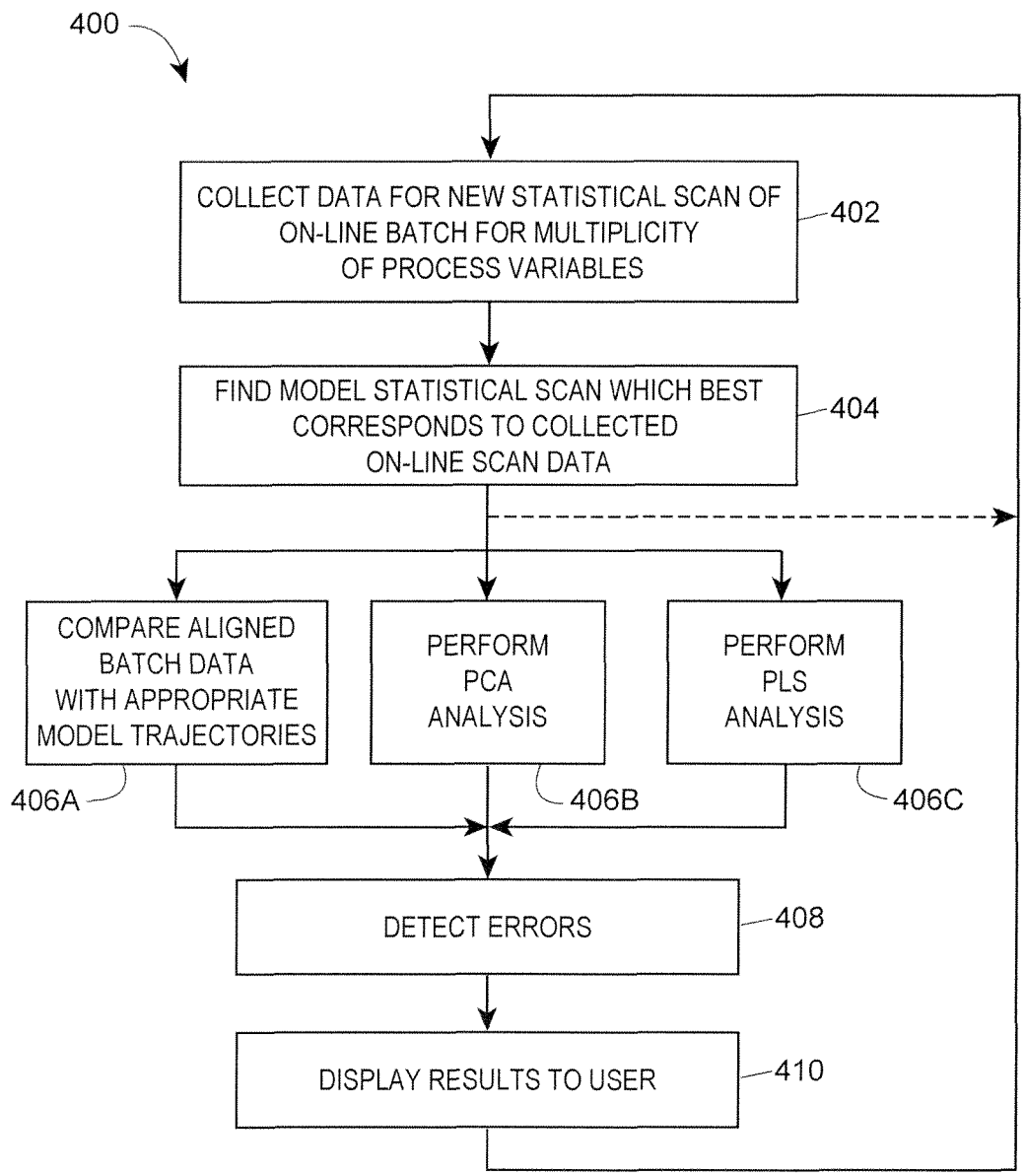
FIG. 8 depicts a flow chart of a routine or a method that may be used to implement a technique of determining an estimate of the position of an on-line batch run with respect to a statistical batch model and performing on-line batch analysis of the batch run based on the estimated position.

Referring now to FIG. 8, a flow chart 400 depicts an example method of performing an on-line analysis of batch data for a new or on-going batch process run based on the batch models created in the method of FIG. 3. Generally speaking, the objective of on-line process monitoring is to detect any abnormal operation of a batch run and to identify the source(s) of the abnormality, so as to be able to compensate for or to correct faults or other batch problems, or to be able to decide, at the soonest possible time, that the batch will not result in an acceptable end product. In the latter case, the operator may then be able to stop the batch run and start over so as to preserve raw materials (not yet used in the batch) and energy that would otherwise be used to implement the batch run to completion, as well as to free up the equipment for use by other batch runs that will result in acceptable end products.

At a block 402, the OMS 102, for example, automatically collects, filters and preprocesses a statistical scan of batch process measurement data, lab analysis data and manual entry data from the on-going or on-line batch for each of a set of process variables to be used in the analysis. Again, as with the batch model, multiple values of the raw data received or collected from the on-line batch run may be combined statistically to create a single measured on-line batch data point, sometimes referred to herein as a statistical scan (which can thus be either a raw data scan or an average or other statistical combination of a number raw data scans). At a block 404, the OMS 102 aligns the current batch data points (which may be a statistical scan of data) with the batch model previously created for the batch by finding the model statistical scan that best corresponds to the collected on-line scan data, using a technique described in detail below. Once the current or on-line batch data is aligned with the batch model, the OMS 102 can perform any desired analysis on the on-line batch data as indicated by the blocks 406.

For example, in the block 406A, the OMS 102 can compare the current on-line batch data with the batch process variable model trajectories and provide any of the screens or user displays discussed above. Moreover, at a block 406B, the operation of the on-line batch process may be monitored or analyzed using a PCA analysis to determine how the current on-line batch process compares to the batch model at the same statistical scan, so as to detect faults. In one example, the on-line batch data, when aligned to the batch model, may be projected to the principal component space and the UCL for the $T^2$ and Q statistics may be tested. Finally, the process variable contribution to the total variance may be defined. Calculating the $T^2$ and Q statistics is well known and therefore will not be discussed in detail herein. Still further, at a block 406C, the OMS 102 may perform a batch quality prediction using, for example, a PLS technique based on a PLS batch model developed for the batch process.

Moreover, at a block 410 the OMS 102 use the analyses of the blocks 406 to detect one or more errors with the batch, and at a block 412 may alert a user to potential faults or problems detected by these analyses. Still further, if desired, the OMS 102 may provide the user with a prediction of the quality metrics of the end product of the current batch, present recommendations as how to alter the control of future stages, phases or operations of the on-line batch, to correct for or to compensate for any faults or problems that have occurred within the batch that may lead to an inferior end product or may perform any other actions with respect to the analysis data. As illustrated by the dotted line in FIG. 8, the OMS 12 continues to collect on-line batch data even while performing the on-line data alignment and model based analysis and providing user displays. Thus, while the method of the flow chart 400 need not perform the analysis and/or display steps of the blocks 406, 408 or 410 after each data collection scan, it could do so if desired.

Figure 9:
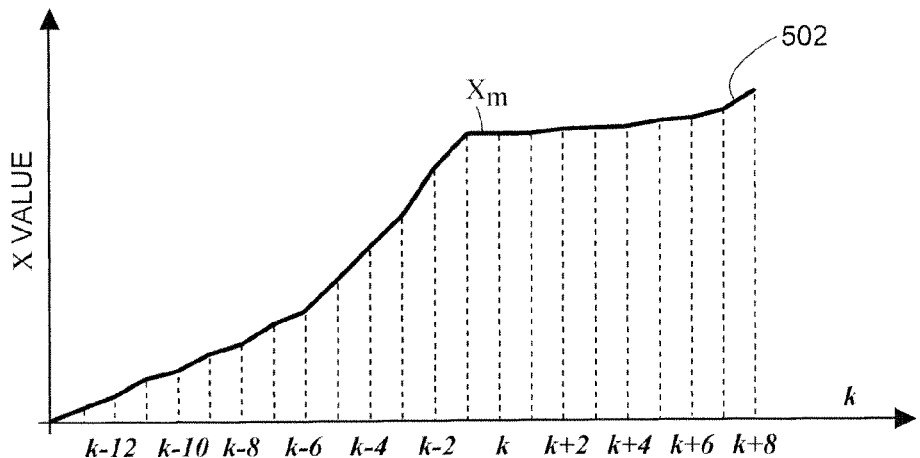
FIG. 9 depicts a process variable trajectory for a particular batch variable divided into a plurality of scans to which on-line batch data will be aligned.

Because historical data alignment for model development has profound results on, for example, the $T^2$ and Q statistics developed at the blocks 406 and 408, the alignment performed by the block 404 is critically important for proper analysis. In one example, an on-line DTW procedure may be applied at the block 404 to match the on-line data to the most similar point in the batch process model trajectories developed for the batch model in the block 160 of FIG. 3. In particular, aligning batch progression data (i.e., on-line batch data) with the batch model during on-line operation using the method described below alleviates process non-linearity and dynamical behavior. In essence, this method of aligning the on-line data to the batch model relies on the assumption that every batch or stage model has a specific set of model parameters for a set of predefined time intervals called statistical scans. Each such scan may include a predetermined number of raw or statistical data points and each scan within the batch or stage model may include the same number of statistical or raw data points. FIG. 9 illustrates an example model process variable trajectory 502 for the model process variable $X_m$ (taken from the batch model developed by the block 160 of FIG. 3) divided into a plurality of equal (in time) statistical scans. The scan positions, as denoted by a dotted lines in FIG. 9, can extend over a time frame having a plurality of data points therein or associated therewith. Preferably, all of the relevant batch process variable model trajectories are divided into the same scan periods.

Once the model process variable trajectories are divided into statistical scan periods or positions, the alignment technique tries to select a single scan position that best fits the current batch state based on the current values of all of the batch process variables. This alignment between the on-line data and the model trajectory data differs from an off-line data alignment technique typically used in batch analyses because the on-line data is incomplete when the data is being aligned. As a result, the batch has not finished running, and so the total time of the on-line batch is not known during the alignment technique. Thus, while an off-line DTW technique usually matches or normalizes batch data in time based on the total length of the batch or a portion of the batch (e.g., a stage, operation or phase), the on-line alignment technique does not know the total length of the batch or the relevant portion of the batch, and so cannot normalize this data in that manner.

To accomplish on-line alignment in a computationally simple manner that can be used to provide on-line or real time analysis, a modification to the typical DTW on-line operation has been developed, and generally operates as follows. Basically, the goal of the technique is to determine the most likely or most probable position of the on-line batch by comparing the most recently collected data point (which may be a statistical data point) of the on-line batch run to the model process variable trajectories in the batch model to determine which scan or scan position within the batch model appears to be the most likely current position of the on-line batch. Generally, this technique uses each new on-line data point (which is typically a matrix of process variable values, with each variable value possibly being a statistical data point) to determine an overall distance for each of a number of scan positions in the batch model. The calculated distances are then used to determine which model scan position is the most likely scan position to which the on-line process is currently aligned.

More particularly, an overall distance for a scan period is calculated from a combination of process variable distances determined for each of the process variables being considered in the model. Each process variable distance is determined as an error or a difference between the current value of the process variable when placed at the last identified (i.e., the most recently determined) scan position within the batch model, and the value of the model trajectory for that process variable at one of the scan positions in the process model. Generally, the scan positions for which the process variable distances are calculated include the current scan position (i.e., the scan position that was determined to be associated with the on-line batch run based on the last collected data point for the on-line batch run) and a set of consecutive scan positions immediately following the current scan position, up to a prediction scan horizon. As noted above, a process variable distance is calculated for every relevant process variable included in the batch model for each scan position being considered. The process variable distances calculated for the different process variables are then combined on a scan by scan basis to create a combined distance for each of the scan positions being considered, and the scan position that has the smallest such combined or overall distance is determined to be the most probable scan position of the on-line batch run.

In one example, a Euclidian distance is determined for each of the process variable distances, with this Euclidian distance being a measure of the distance between the on-line batch trajectory of a process variable and the model process variable trajectory for that process variable. More particularly, this Euclidian distance extends from the current on-line batch variable value when placed at the last determined scan position of the on-line batch run, to one of a preset number (h) of scan positions into the future. The process variable distances calculated for each process variable for a particular scan position are then squared and summed, to produce a sum of squared process variable distances for each scan position. Thereafter, the scan position that has the minimum sum of squared process variable distances associated therewith is selected as the scan position to which the on-line process is most likely associated or to which the on-line process is currently aligned.

Figure 10:
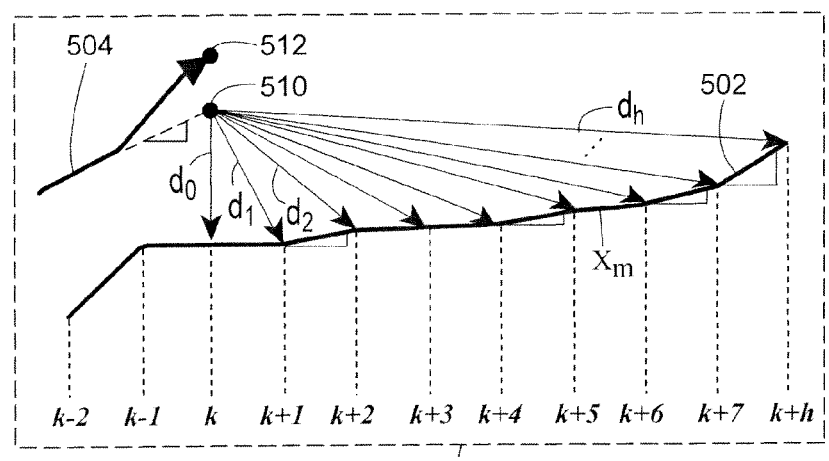
FIG. 10 depicts a graph illustrating a manner of determining an estimate of the position of a process variable within an on-line batch with respect to the model trajectory for that process variable of FIG. 9.
Figure 10:
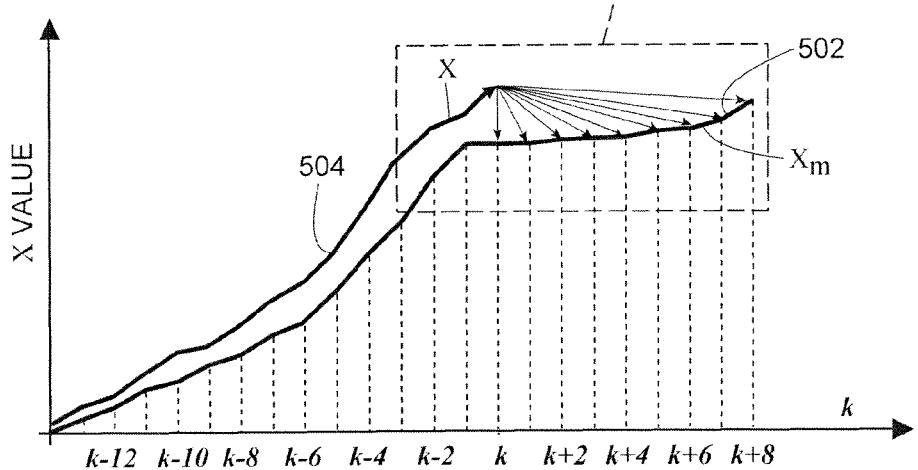

This technique can be graphically illustrated using FIG. 10, which depicts the model process variable trajectory 502 (e.g., a mean process variable trajectory from the batch model) of FIG. 9 for the process variable X, again denoted as $X_m$. FIG. 10 also illustrates a determined trajectory 504 for the measured or on-line process variable X, which of course corresponds to the process variable $X_m$ of the batch model. In particular, the line 504 represents the trajectory of the measured or on-line process variable X as determined in the past using the technique described herein. In this case, the scan position (dotted line) marked as k is the scan position that was most recently determined to be the best fit or the most likely position of the on-line batch after the receipt of the last measured set of process variables from the on-line batch run, while the scan k+1 is the scan position immediately following the scan k, and so on.

To determine the position of a new or most recently measured set of values for the batch process variables from the on-line batch run, the technique determines the model scan position (k, k+1, k+2, etc.) that appears to be the most likely position of the batch based on the most recently measured or determined batch variable values for all of the measured process variables currently relevant in the batch model. This most recent set of on-line batch measurement values is referred to herein as the "current" batch data point. Generally speaking, referring to the graph of FIG. 10, the technique determines a value representing the distance from the current process variable value of the process variable X to the value of the process model trajectory $X_m$ at the scan position that was most recently determined to be the position of the on-line batch run. Referring to the expanded portion in FIG. 10, a point 510 is the current value of the measure process variable X, when placed at the most recently determined scan position k. The point 512 is the value of the on-line process variable X immediately prior to the current value, and for which the scan position k was previously determined to be the most likely position of the on-line batch. Here, it is noted that the on-line batch trajectory is connected to the point 512, as the scan position associated with the current value of the process variable X is still not determined. Moreover, as illustrated by the differences between the positions of the points 510 and 512, the values of the current process data for the variable X, and the previous value of this variable have different magnitudes.

In any event, a set of Euclidian distances $d_0, d_1, d_2, \ldots d_h$ are calculated from the point 510 (the current data point) to points on the model process variable trajectory at the scan positions k, k+1, k+2, . . . k+h. These distances express the differences or errors between the current on-line process variable value for the process variable X when placed at the scan position k (the most recently determined position of the on-line process) and the process variable model trajectory $X_m$ for the current scan position and each of a preset number of scan positions into the future (the prediction horizon). In this case, the distances being calculated are Euclidian distances on the graph of FIG. 10. While FIG. 10 illustrates these distance calculations for a single process variable X, with respect to the corresponding process model variable trajectory $X_m$, similar calculations are determined for each of the process variables that are used in the model or that are relevant at that particular point (e.g., stage, operation, phase, etc.) in the batch process.

Next, the technique calculates the sum of the squared distances determined for each process variable on a scan by scan basis. That is, the distances $d_0$ (associated with the current scan position) for each process variable is squared and then these squared distances are added together to produce a first sum associated with the scan position k. Likewise, the distances $d_1$ (associated with the k+1 scan position) determined for each process variable are squared and these squared distances are added together to produce a second sum associated with the scan position k+1. This summation process is repeated for each of the scan positions (k+3 . . . k+h) being considered. Of course, the distances $d_0, d_1$, etc. are squared to obtain a positive magnitude in all cases, as these distances represent an error between the current measured values of the process variables of the batch run and the model trajectory values for those process variables at each scan position. In a similar manner, the absolute values of the distances $d_0, d_1$, etc. could be determined instead of the squared distances $d_0, d_1$, etc. In any event, the smallest sum of the distances (squared or having the absolute value thereof) defines the scan position (k, k+1, k+2, . . . k+h) that is the most likely the position of the current on-line batch. Thus, the smallest sum of distances is used to select the model scan position at which the on-line process is determined to be with respect to the model.

It will be understood that this technique may, at any particular time, determine that the current scan position (k) is associated with the shortest summed and squared process variable distance calculation and that, therefore, the on-line batch has not moved or progressed since the last set of measured or on-line variables. On the other hand, this technique may determine that the best estimate of the position of the on-line batch run is the next scan position ahead in time (k+1) or more than one scan positions ahead in time (e.g., scan position k+2, scan position k+3, etc.) Thus, the technique may actually determine that the best current estimate of the on-line batch has moved or jumped multiple scan positions since the last alignment determination. However, at no point is the on-line batch alignment method able to go backwards in scan positions (e.g., scan positions k−1, k−2, etc.) as this would lead to modeling and prediction non-linearities. That is, once the alignment technique determines that the on-line batch has reached a particular scan position with respect to the batch model, the technique does not allow a subsequent or future estimate to go backward in time (to a previous model scan position). However, the technique may keep the on-line batch position estimate at the current model scan position k for any needed amount of time. In this latter case, the technique may ignore all previously collected on-line data points that were previously determined to be associated with the scan position k in future calculations, or may statistically combine the current data point with the previously collected data points determined to be associated with the same scan position. Thus, in the example of FIG. 10, if the technique determines that the data point 510 is associated with the scan k, the technique may discard the data point 512 (so that the on-line batch trajectory will connect to the point 510 instead of the point 512) or may statistically combine the data point 510 with the data point 512 to produce a new measured value of the on-line batch variable X at the scan position k.

In any event, the distance calculations described above may be expressed as a sum of a set of squared distances and, in one example, may be expressed in matrix form as:

$$e(k,j)=[M(k)-X(j)]^T W[M(k)-X(j)] \quad k=k, k+1, k+2 \ldots k+h \qquad (1)$$

where:
- e(k, j)—a scalar representing the sum of the squared distances between a set of on-line variable process measurements at the sample measurement time j (placed at the current scan position k=k) and the model trajectory values for those variables at a scan position k (wherein k=k, k+1, . . . k+h);
- M(k)—a matrix of batch model trajectory variable values (one for each process variable) at the scan position k (wherein k=k, k+1, . . . k+h);
- X(j)—a matrix of the on-line variable values at the sample measurement time j (placed at the current scan position k=k);
- j—the current or most recent batch sample time;
- k—the scan position on the model trajectory with k=k being the last determined scan position to which the on-line batch is aligned;
- h—the model alignment horizon; and
- W—a matrix of parameter weights (a diagonal matrix), defined at for example model development that defines the relative importance to each variable X in the distance calculation.

Here, the W matrix is a diagonal matrix of weighting parameters that may be used to weight the Euclidian distances determined for some of some process variables more or less than others of the process variables, so as to be able to tailor the distance calculation to favor (or rely more heavily on) process variables known to be more correlated with or better indicators of the current position of the on-line batch with respect to the batch model. Of course, to weight all process variables equally, the W matrix could be set to be a unity matrix.

As will be understood from equation (1), the distance e (which is a sum of squares of the individual process variable distances) is calculated for the most recent batch sample j to the most recently determined scan position k on each reference model trajectory, and up to the next consecutive h scan positions or scans ahead in the batch model (i.e., k+1, k+2 . . . k+h).

As a modification to or instead of the distance calculation described above, it may be desirable to account for the derivatives (i.e., the slopes) of the on-line trajectory and the model trajectory in the matching the on-line data to the process model. In particular, the distance calculation may include differences between the slopes of the currently determined process variable trajectory and the model trajectory of the process variable at each scan position being considered, in an attempt to select the next scan position based completely or in part on the matching of the slopes of the current batch trajectories with the model trajectories. In this case, the derivatives of the each on-line trajectory and each associated model trajectory are calculated for the same model scan position as used in the Euclidian distances determined in equation (1) as described above. The slope for the current on-line process variable value is illustrated in FIG. 10 on a dotted line drawn from the on-line batch trajectory at the scan position k−1 to the point 510, while the slopes associated with some of scan positions on the model trajectory (for scan positions k+2, k+5, k+7, etc.) are also graphically illustrated in FIG. 10. This derivative distance calculation may, in one example, be as expressed as:

$$d(k,j)=[(M(k)-M(k-1))-(X(j)-X(j-1))]^T W[(M(k)-M(k-1))-(X(j)-X(j-1))] \quad (2)$$

where:
- M(k)—a matrix of batch model trajectory variable values one for each process variable) at the scan position k;
- M(k−1)—a matrix of batch model trajectory variable values (one for each process variable) at the scan position k−1;
- X(j)—a matrix of the on-line variable values at the sample measurement time j when placed at the scan position k=k;
- X(j−1)—a matrix of the on-line variable values at the sample measurement time j−1 defined to be the sample measurement time associated with the determined scan position k=k−1;
- j—the current measured batch sample time;
- k—the last aligned scan position on the reference trajectory
- h—model alignment horizon
- W—a diagonal matrix of parameter weights, which may be defined at the model development to gives relative importance to each process variable used in the calculation.

A total distance D(k, j) may then be defined as a weighted sum of the Euclidian distance and derivative distance as:

$$D(k,j)=\alpha e(k,j)+\beta d(k,j) \quad 0 \le \alpha, \beta \le 1 \quad (3)$$

Here, alpha ($\alpha$) and beta ($\beta$) are weighting factors that define the relative importance of the two distance calculations (the Euclidian and derivative distances) in the overall distance calculation. These weighting factors may be selected in any desired manner, such as by an operator or user, using model fitting techniques, etc. In one case, which normalizes the calculation, $\alpha$ plus $\beta$ may be equal one. Moreover, if desired, either $\alpha$ or $\beta$ may be set to zero.

Still further, to add stability and robustness to the on-line distance calculations described above, an optional batch progression normalized time variable may be created and included into variable parameter set. In other words, an indicator variable alignment method such as one of those of the prior art discussed above, may be used by including an indicator variable into the process variable set, and this indicator variable may be added as one of the variables in the Euclidian distance and/or the slope difference determination. Alternatively, the distance calculations described above may be combined (using appropriate weights if desired) with an indicator technique calculation to determine the most likely model scan position of the on-line batch run so that the determined indicator variable alignment is used in conjunction with the difference between the process variable values of the on-line batch process run and the model trajectory values for those process variables at each of a number of model scan positions to determine which of the number of model scan positions to which the on-line batch process run is aligned.

Still further, to further improve the stability of the process and to avoid progressing to quickly through the model scans (which may occur in, for example, batch process with flat process variable trajectories), a penalty may be added to the distance calculation to bias the determination against progressing too fast or too quickly through the model scan positions. More particularly, it may be desirable to have the distance calculation include a penalty for moving ahead a scan position, as compared to staying in the same location or staying at the same scan position. Still further, this penalty may increase in magnitude or degree when moving ahead more than one scan position. In other words, the penalty for moving ahead two scan positions in a single move may be twice the penalty for moving ahead one scan position, or may be more or less than twice the penalty for moving ahead a single scan position so as to penalize the calculation in favor of moving the fewest number of scan positions in any one determination. This type of penalty calculation biases the distance calculation in a manner that is more likely to have the determination of the new scan position of the on-line batch stay at the same scan position, or move ahead a fewer number of scan positions when the distance calculations for different scan positions are otherwise similar or close to one another, which can happen in many instances. In other words, it may be desirable to have a penalty variable that biases the determination to remain at the same scan position to move as few scan positions as possible when the sum of the squared distances associated with multiple scan positions are roughly the same (or even when the distances for scan positions further into the future are otherwise less than the distance for the current scan position). The reason for applying this penalty variable is precisely because it is impossible to move back in time through the batch model once a decision has been made to select a particular scan position in the model as the current location of the on-line batch process. Thus, this penalty assessment provides stability in the alignment method so as to ensure that moves forward in time (scan positions) are justified.

One manner of expressing a manner of penalizing fast progress through the scan positions k is to modify distance expression of equation (3) as:

$$D(k,j)=(1+|\gamma(i+\delta)|)D(k,j) \quad 0 \le \gamma; k=k+i; i=0,1,\ldots,h; 0 \le \delta \le 1 \quad (4)$$

with the solution being the index k that satisfies the condition $$\min_k \{D(k,j)\} \quad (5)$$

Here, the penalty variable $\gamma(i+\delta)$ may be established as a base penalty $\gamma$ modified to increase in size by greater amounts as i (the number of scan positions into the future for which the penalty is being determined) increases. The secondary penalty variable δ may be constant or may also change as i increases.

In any event, the weighting matrixes W illustrated above enable a process variable with a higher correlation to the position of the on-line batch to be weighed higher or have more effect in the distance calculation, and thus have more effect in the determination of the current position of the on-line batch process, than other process variables. This method may also provide an integration the DTW method and indicator variable alignment technique, and may recalculate the alignment of an on-line batch process run with the model scan positions at the end of each or every batch stage (called back calculation), which is applicable primarily for quality prediction. In particular, the method described herein may recalculate alignment of the on-line batch process run at each of a number of model scan positions at the end of each batch stage based on a measured batch quality variable determined at the end of the batch stage.

The DTW alignment algorithm described herein may also be used in continuous processes with changing process trajectories, states or other modes of operation. In this case the alignment algorithm may be to detect mode changes in a continuous process that has rapidly or gradually changing process trajectories, states or other modes of operation, to better identify the changing modes or process states in a continuous process. More particularly, the alignment technique may be used to identify a discrete process mode as one of a set of possible modes under which the process can be operating, and the detected mode or state change may lead to the use of a different model to analyze the process under the current conditions.

Of course, modifications to the distance calculations described above can be made to compute different differences or to add other factors to be taken into account within the distance calculations if so desired. Moreover, as will be understood, these calculations may be performed within any on-line batch analysis routine, such as the routine 50 of FIG. 1, the OMS 102 of FIG. 2, etc.

Based on testing, some problems have been identified with the synchronization of on-line batch trajectories, including the fact that transition points in a batch can cause significant statistical deviations when the on-line alignment method described above is off by just one scan. Moreover, slow changing data signals for consistent batches which are also tightly clustered across all batches of the training set can produce very small model scan standard deviations, which in turn, can intersect the noise space and cause false alarms. Still further, an online data value at the beginning or end of a statistical scan of a monotonically changing signal may be beyond the sigma boundary for the analysis and cause a false alarm. However, to reduce these problems, some modifications can be made to the off-line model building technique which increase model robustness and greatly improve the effectiveness of the on-line DTW algorithm described above.

Figure 11:
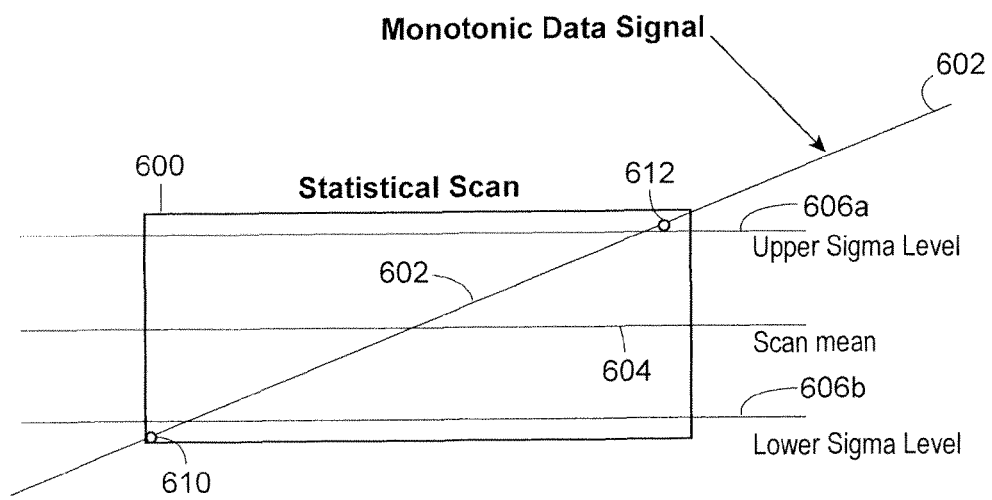
FIG. 11 depicts a graph illustrating a monotonically changing process variable over a statistical scan period and the upper and lower bounds of that variable used for alarming purposes.

In particular, with achievable accuracy of model synchronization, an online sample may fall near the beginning or end of a model scan. It will be understood that each model scan may be a combination of a number, e.g., 100, statistical batch data points. As a result, the on-line DTW method described above might align the sample with the correct model scan, but in the case of a signal which monotonically changes over the scan period, a statistical deviation could still occur. In particular, the measured sample, while associated with the correct scan, may be associated with a time that is earlier in the model scan or later in the model scan and, because the measured signal is monotonically changing over the entire scan period, the measured signal may fall outside of the upper or lower sigma level (e.g., the standard deviation of the model for the scan) and thus may trigger an alarm. FIG. 11 illustrates this concept. Here, a single statistical scan period 600 is illustrated with a continuous monotonic data signal 602 plotted there-though. Because a number of raw data measurements (or even statistical data measurements, each of which is a combination of a number of raw data measurements) will be collected during the scan period 600, the value associated with scan period 600 as stored in the batch model will be the average or mean of the various data points collected during the statistical scan period 600. This value is illustrated by the line 604. Moreover, because the signal 602 is monotonic, it will have a relatively small upper and lower sigma (e.g., variance) used for error detection purposes, these values being illustrated by the lines 606A and 606B. Now a measured data point 610 may be, in reality, aligned with the beginning of the scan period 600 and may indeed match the line 602 perfectly. However, the alignment method described above, while associating the point 610 with the correct scan period 600, will still result in a determination that the data point 610 falls below the lower sigma level 608B calculated for the scan period 600, resulting in the detection of an error. A similar thing happens for the point 612 falling later in the scan period 600, and which falls above the upper sigma level 606A.

Figure 12:
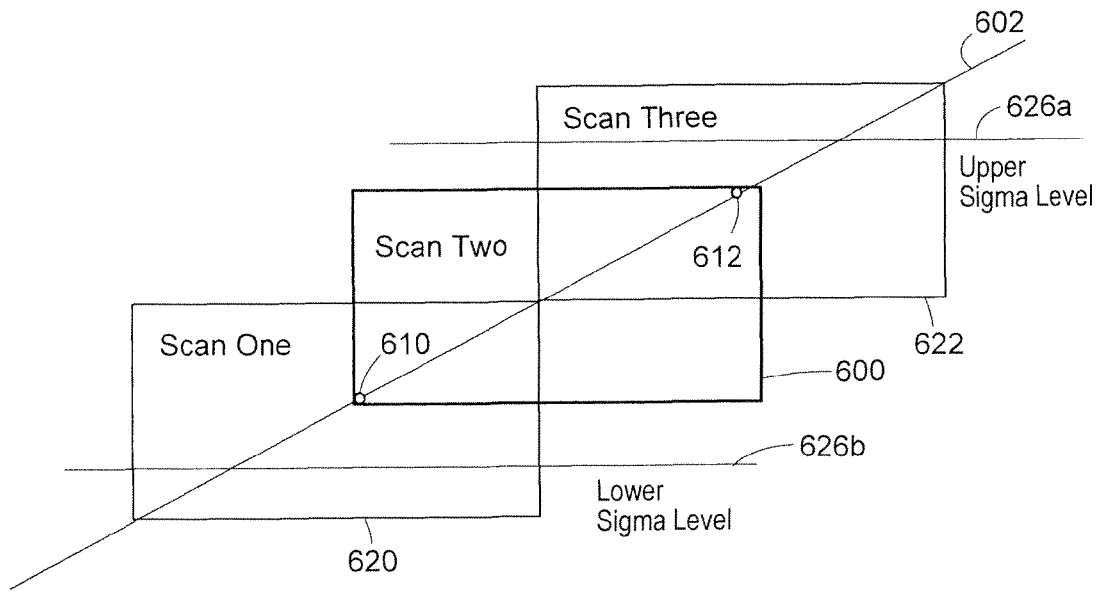
FIG. 12 depicts a graph illustrating a method of model scan blending that may be used to develop a statistical process model.

A method that may be used to help correct for this problem includes off-line preprocessing of the batch model, and is referred to herein as model scan blending. This method generally overlaps adjacent scans in time, and uses the values of the process variables for the scan ahead of and the scan behind the current scan within the calculation of the mean value and standard deviation for the current scan. This overlapping of scan data between adjacent scans adds robustness to the batch model. FIG. 12 illustrates this model scan blending method, and illustrates the scan 600 as overlapping the scan 620 (the scan prior to the scan 600) and the scan 622 (the scan following the scan 600). This overlapping of scans reduces false alarms. Here, it will be understood that the value for the scan 600 is the mean of all of the data values collected for the scans 600, 620, and 622 and that the upper and lower sigma levels 626A and 626B are determined based on all of the data values collected for the scans 600, 620 and 622, resulting in model scan blending. Importantly, this model scan blending causes the measured data points 610 and 612 to fall within the sigma levels 626A and 626B of FIG. 12 even though these points are associated with the beginning or end of the scan 600. This technique enhances the ability for the on-line algorithm to synchronize with the batch model as transition points are better handled through the more robust model scan content. An increased length of the scan helps handle tightly clustered signals across the batches of the training set and the use of model scan blending eliminates the false alarms caused by monotonic signals offset to the end or beginning of a model scan. Moreover, the combination of the direct on-line DTW algorithm and the off-line preprocessing of the model are complimentary technologies that result in a more robust tracking of on-line batch trajectories with that of a statistical model.

Simulation tests of the method disclosed herein were performed using a first principles mammalian cell simulated bioreactor and a running chemical plant. In each case, data was collected from historical batches and statistical models were generated. Partial least squares prediction were made for a single quality variable, usually determined from a lab analysis, via post processing. The results were compared to those obtained from a non-DTW on-line analysis process (i.e., a prior art method), an on-line DTW analysis method substantially as described above, and this on-line DTW analysis with back calculation provided after completion of the batch. The back calculation shows a correction of the on-line prediction when a batch increment or stage has completed. In many cases lab results are not known for hours or days from the end time of the batch and thus a corrected prediction of batch quality at the end of the batch has additional value.

Figure 13:
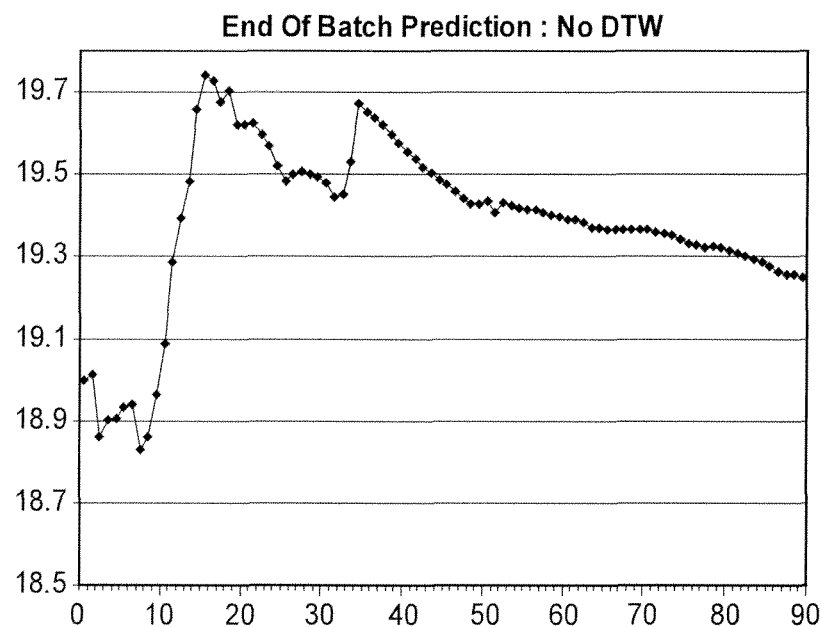
FIG. 13 depicts a graph of quality predictions produced by a prior art method of on-line batch analysis.
Figure 14:
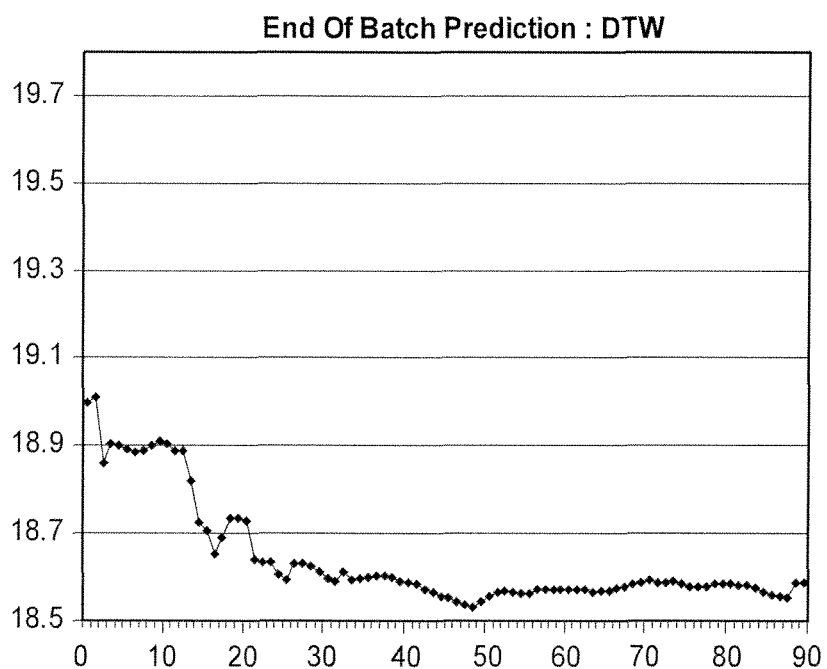
FIG. 14 depicts a graph of quality predictions produced by a method of on-line batch analysis described herein.
Figure 15:
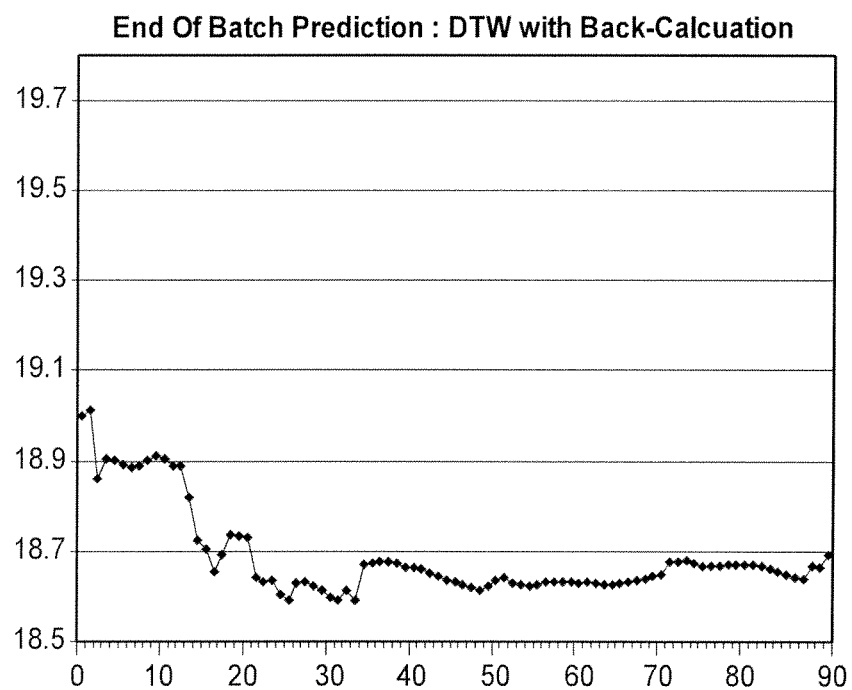
FIG. 15 depicts a graph of quality predictions produced by a method of on-line batch analysis described herein as depicted in FIG. 14, using back calculation performed after completion of the batch or batch stage to compensate for the measured quality determined at the end of the batch or batch stage.

FIGS. 13-15 illustrate an identical batch run with a model using the prior art method (FIG. 13), a DTW method as described above (FIG. 14) and the DTW method described above with back-calculation (FIG. 15). Here, the actual lab analysis of the batch resulted in a 18.7 value. With no DTW (the prior art alignment method), the prediction is significantly skewed from this estimate, as illustrated in FIG. 13. Here, each scan of the process was synchronized in time only, and if the on-line batch ran longer than the model, then the last model scan was repeated. As illustrated in FIG. 14, the DTW method described above shows significant improvement in the predicted output of the quality variable. The DTW method with back calculation makes an adjustment to the prediction at the end of a batch progress increment and the back calculation implements a refactoring of the prediction based on a complete DTW algorithm and a known end point. The iterative synchronization, allows for a correction to be made to the prediction at future times and the correction is most noticed when a batch length varies from the model length. For example, the prediction calculation in FIGS. 14 and 15 are the same with the exception of a correction made at scans 33, 52, 73, and at the end. The result is the prediction closest to the real value of 18.7.

In any event, the DTW algorithm for on-line model alignment with on-line batch operation simply minimizes a total trajectory distance and a total derivative of the trajectory distance, and is thus an effective and proper on-line implementation technique because it is computationally simple. Moreover, adding normalized batch or stage time to the parameter set improves algorithm stability and robustness. The algorithm effectiveness has been tested on simulated and real batch data from bioreactor and chemical reactor and the tests confirmed that model alignment not only improved PCA and PLS performance but makes it a basic functionality for adequate batch process monitoring and quality prediction.

As noted above, at least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as a magnetic medium (e.g., a magnetic disk or tape), a magneto-optical or optical medium such as an optical disk, or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification describes example methods, systems, and machine-accessible medium, the examples are not the only way to implement such systems, methods and machine-accessible medium. Therefore, although certain example methods, systems, and machine-accessible medium have been described herein, the scope of coverage of this patent is not limited thereto.

What is claimed is:

1. A method of aligning an on-line process run to a process model having a model trajectory for each of a multiplicity of process variables, the method comprising:

receiving, at a computer device, value data from the on-line process run indicative of a current value for each of the multiplicity of process variables at a particular sample time;

storing the received value data from the on-line process run in a computer readable memory;

for each of the multiplicity of process variables, using the computer device to determine a plurality of distances corresponding to a plurality of model scan positions, each of the plurality of distances indicating a distance between the current value of the process variable and a model trajectory value for that process variable within the process model at the corresponding one of the plurality of model scan positions;

for each of the plurality of model scan positions, using a computer device to sum the ones of the plurality of distances determined for each of the multiplicity of the process variables that correspond to the model scan position to produce, for each of plurality of model scan positions, a summed distance;

using a computer device to determine a minimum summed distance from the summed distances determined for the plurality of model scan positions; and selecting one of the plurality of model scan positions associated with the determined minimum summed distance as the model scan position to which the on-line process run is currently aligned.

2. The method of aligning an on-line process run to a process model of claim 1, wherein using the computer device to determine a plurality of distances corresponding to a plurality of model scan positions, each of the plurality of distances indicating a distance between the current value of the process variable and a model trajectory value for that process variable within the process model at the corresponding one of the plurality of model scan positions includes using a plurality of model scan positions comprising a most recently determined model scan position and one or more model scan positions forward in time than the most recently determined model scan position.

3. The method of aligning an on-line process run to a process model of claim 1, wherein using the computer device to determine a plurality of distances corresponding to a plurality of model scan positions, each of the plurality of distances indicating a distance between the current value of the process variable and a model trajectory value for that process variable within the process model at the corresponding one of the plurality of model scan positions includes determining a Euclidian distance between the current value of the process variable and the model trajectory value for the process variable at the corresponding one of the plurality of model scan positions.

4. The method of aligning an on-line process run to a process model of claim 3, further including squaring the Euclidian distances.

5. The method of aligning an on-line process run to a process model of claim 3, wherein using the computer device to determine a plurality of distances corresponding to a plurality of model scan positions, each of the plurality of distances indicating a distance between the current value of the process variable and a model trajectory value for that process variable within the process model at the corresponding one of the plurality of model scan positions, further includes determining a slope difference distance defining a difference between the slope of the current value of the process variable and the slope of the model trajectory for that process variable at one of the plurality of model scan positions and includes combining the Euclidian distance and the slope difference distance to produce a combined distance as the distance between the current value of the process variable of the on-line process run and the model trajectory.

6. The method of aligning an on-line process run to a process model of claim 5, further including weighting the Euclidian distance and the slope difference distance differently when combining the Euclidian distance and the slope difference distance to produce the combined distance between the current value of the process variable of the on-line process run and the model trajectory.

7. The method of aligning an on-line process run to a process model of claim 3, wherein using a computer device to sum the ones of the plurality of distances determined for each of the multiplicity of the process variables that correspond to the model scan position further includes weighting the ones of the plurality of distances determined for each of the multiplicity of process variables that correspond to the model scan position unequally when computing the sum.

8. The method of aligning an on-line process run to a process model of claim 3, further including assigning a penalty factor to one or more of the summed distances based on the model scan position with which the one or more of the summed distances—is associated.

9. The method of aligning an on-line process run to a process model of claim 8, wherein assigning the penalty factor includes assigning a penalty factor that increases as the model scan position increases in time from a most recently determined model scan position.

10. The method of aligning an on-line process run to a process model of claim 1, wherein using the computer device to determine a plurality of distances corresponding to a plurality of model scan positions, each of the plurality of distances indicating a distance between the current value of the process variable and a model trajectory value for that process variable within the process model at the corresponding one of the plurality of model scan positions includes determining a slope difference distance as a distance between a slope of the current value of the process variable and a slope of the model trajectory for the process variable at each of the plurality of model scan positions.

11. A method of performing analysis of an on-line process run of a batch process, comprising:
generating, on a computer device, a statistical model having a model trajectory for each of a multiplicity of process variables prior to the on-line process run, the statistical model having a number of model scan positions;
storing the statistical model in a computer readable memory;
receiving, at a computer device, data from the on-line process run indicative of a current value for each of the multiplicity of process variables at a most recent time of measurement;
using the computer device to analyze the current value for each of the multiplicity of process variables to determine which of the number of model scan positions to which the on-line process run is aligned, wherein using the computer device to analyze the current value for each of the multiplicity of process variables includes:
for each of the multiplicity of process variables, determining a distance between the current value of the process variable of the on-line process run and a model trajectory for that process variable within the process model at each of a plurality of model scan positions;
for each of the plurality of model scan positions, summing the distances determined for the multiplicity of the process variables that correspond to the respective model scan position to produce a summed distance;
determining a minimum summed distance from the summed distances determined for the plurality of model scan positions; and
selecting the model scan position associated with the determined minimum summed distance as the model scan position to which the on-line process run is currently aligned; and
performing an analysis on the on-line data based on the determined alignment.

12. The method of performing analysis of an on-line process run of claim 11, wherein generating the statistical model includes collecting data for each of the multiplicity of process variables for a plurality of runs of the process, aligning the data for each of the plurality of runs of the process by skewing the data of each of the plurality of runs of the process to a normalized time frame, and developing each of the model trajectories of the statistical model as a statistical measure of the data in the normalized time frame.

13. The method of performing analysis of an on-line process run of claim 12, wherein the model trajectories include a measure of the mean of a process variable at each of a set of normalized times.

14. The method of performing analysis of an on-line process run of claim 12, wherein the model trajectories include a statistical measure of a variance of a process variable at each of a set of normalized times.

15. The method of performing analysis of an on-line process run of claim 11, wherein performing an analysis on the on-line data based on the determined alignment includes comparing the on-line data of one of the process variables to the model trajectory for that process variable.

16. The method of performing analysis of an on-line process run of claim 15, further including determining if the on-line data for a process variable falls outside of a range associated with the model trajectory for that process variable and indicating a problem if the on-line process data for the process variable falls outside of the range associated with the model trajectory for that process variable.

17. The method of performing analysis of an on-line process run of claim 11, wherein performing an analysis on the on-line data based on the determined alignment includes performing a principle component analysis procedure on the on-line data.

18. The method of performing analysis of an on-line process run of claim 11, wherein performing an analysis on the on-line data based on the determined alignment includes performing a projection to latent structure analysis on the on-line data to determine a predicted quality of the on-line process run.

19. The method of performing analysis of an on-line process run of claim 11, wherein performing an analysis on the on-line data based on the determined alignment includes determining a predicted quality of the on-line process run based on the statistical model.

20. The method of performing analysis of an on-line process run of claim 11, wherein determining a distance between the current value of the process variable of the on-line process run and a model trajectory for that process variable at each of the number of model scan positions includes using a number of model scan positions comprising the most recently determined model scan position and a preset number of one or more model scan positions forward in time than the most recently determined model scan position.

21. The method of performing analysis of an on-line process run of claim 20, wherein determining a distance includes determining a Euclidian distance between the current value of the on-line process variable when at the most recently determined model scan position and the model trajectory for the process variable at one of the number of model scan positions.

22. The method of performing analysis of an on-line process run of claim 21, wherein determining a distance further includes determining a slope difference distance defining a difference between a slope of the on-line process variable when at the most recently determined model scan position and the slope of the model trajectory for that process variable at one of the number of model scan positions and includes combining the Euclidian distance and the slope difference distance to produce the distance between the process variable of the on-line batch process run and the model trajectory.

23. The method of performing analysis of an on-line process run of claim 22, further including weighting the Euclidian distance and the slope differently when combining the Euclidian distance and the slope difference distance to produce the distance between the process variable of the on-line process run and the model trajectory.

24. The method of performing analysis of an on-line process run of claim 20, further including weighting the distances determined for the multiplicity of process variables unequally when computing the sum.

25. The method of performing analysis of an on-line process run of claim 20, further including assigning a penalty factor to one or more of the sums based on the model scan position with which a sum is associated.

26. The method of performing analysis of an on-line process run of claim 25, wherein assigning the penalty factor includes assigning a penalty factor that increases as the model scan position increases in time from the most recently determined model scan position.

27. The method of performing analysis of an on-line process run of claim 11, wherein generating the statistical model having a model trajectory for each of a multiplicity of process variables includes statistically combining measured data from multiple model scan positions to develop a model trajectory value for a process variable at a particular model scan position.

28. The method of performing analysis of an on-line process run of claim 11, wherein analyzing the current value for each of the multiplicity of process variables to determine which of the number of model scan positions to which the on-line process run is aligned includes determining an indicator variable alignment and using the determined indicator variable alignment in conjunction with the difference between the process variable values of the on-line process run and the model trajectory values for those process variables at each of a number of model scan positions to determine which of the number of model scan positions to which the on-line process run is aligned.

29. A computer device for use in aligning an on-line batch process run to a batch process model having a model trajectory for each of a multiplicity of batch process variables, comprising:
   a non-transitory computer readable memory having a computer implemented application stored thereon, the application including:
   a first routine that receives, at a computer device running the first routine, value data from the on-line batch process run indicative of a current value for each of the multiplicity of batch process variables at a particular sample time;
   a second routine that stores the received value data from the on-line batch process run in a computer readable memory;
   a third routine that, for each of the multiplicity of batch process variables, determines a plurality of distances corresponding to a plurality of model scan positions, each of the plurality of distances indicating a distance between the current value of the batch process variable and a model trajectory value for that batch process variable within the batch process model at the corresponding one of the plurality of model scan positions;
   a fourth routine that, for each of the plurality of model scan positions, sums the ones of the plurality of distances determined for each of the multiplicity of the batch process variables that correspond to the model scan position to produce, for each of plurality of model scan positions, a summed distance;
   a fifth routine that determines a minimum summed distance from the summed distances determined for the plurality of model scan positions; and
   a sixth routine that selects one of the plurality of model scan positions associated with the determined minimum summed distance as the model scan position to which the on-line batch process run is currently aligned.

30. The computer device of claim 29, wherein the third routine uses a plurality of model scan positions comprising a most recently determined model scan position and one or more model scan positions later in time than the most recently determined model scan position.

31. The computer device of claim 29, wherein the third routine determines a Euclidian distance between the current value of the batch process variable when at the most recently determined model scan position and a value of the model trajectory for the batch process variable at one of the plurality of model scan positions.

32. The computer device of claim 31, wherein the third routine squares the Euclidian distance to determine the distance for the current value of the process variable.

33. The computer device of claim 31, wherein the third routine determines an absolute value of the Euclidian distance to determine the distance for the current value of the process variable.

34. The computer device of claim 31, wherein the third routine further determines a slope difference distance defining a difference between a slope of the batch process variable when at the most recently determined model scan position and a slope of the model trajectory for that batch process variable at one of the plurality of model scan positions and includes combining the Euclidian distance and the slope to produce a combined distance as the distance between the process variable of the on-line process run and the model trajectory.

35. The computer device of claim 34, wherein the third routine further includes weighting the Euclidian distance and the slope difference distance differently when combining the Euclidian distance and the slope difference distance to produce the distance between the process variable of the on-line process and the model trajectory.

36. The computer device of claim 31, wherein the fourth routine weights the distances determined for different ones of the multiplicity of process variables for a particular model scan position unequally when computing the summed distances.

37. The computer device of claim 31, wherein the fourth routine assigns a penalty factor to one or more of the summed distances based on the model scan position with which a summed distance is associated.

38. The computer device of claim 37, wherein the fourth routine assigns the penalty factor as a variable that increases in magnitude as the model scan position increases in time away from the most recently determined model scan position.

39. The computer device of claim 31, wherein the third routine determines the plurality of distances as a difference between a slope of the on-line batch process variable when at the current value and a slope of the model trajectory for the batch process variable at one of the plurality of model scan positions.

* * * * *